US011842500B2

(12) United States Patent
Tsai et al.

(10) Patent No.: US 11,842,500 B2
(45) Date of Patent: *Dec. 12, 2023

(54) FAULT-TOLERANCE TO PROVIDE ROBUST TRACKING FOR AUTONOMOUS AND NON-AUTONOMOUS POSITIONAL AWARENESS

(71) Applicant: Trifo, Inc., Santa Clara, CA (US)

(72) Inventors: Grace Tsai, Campbell, CA (US); Zhe Zhang, Sunnyvale, CA (US); Shaoshan Liu, Fremont, CA (US)

(73) Assignee: Trifo, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,576

(22) Filed: Apr. 19, 2021

(65) Prior Publication Data
US 2021/0240198 A1 Aug. 5, 2021

Related U.S. Application Data

(63) Continuation of application No. 16/697,094, filed on Nov. 26, 2019, now Pat. No. 10,983,527, which is a
(Continued)

(51) Int. Cl.
*G06T 7/246* (2017.01)
*G06V 20/56* (2022.01)
(Continued)

(52) U.S. Cl.
CPC .......... *G06T 7/246* (2017.01); *G01C 21/005* (2013.01); *G01C 21/10* (2013.01);
(Continued)

(58) Field of Classification Search
CPC .......... G06T 7/20; G06T 7/246; G06T 7/248; G06T 7/70; G06T 7/73; G06T 7/74;
(Continued)

(56) References Cited

U.S. PATENT DOCUMENTS 8,380,384 B2   2/2013   Lee et al.
8,565,958 B1   10/2013  Montemerlo et al.
(Continued)

FOREIGN PATENT DOCUMENTS

CN   106537186 A   3/2017
CN   107137026 A   9/2017
(Continued)

OTHER PUBLICATIONS

Li, et.al., "High-precision, consistent EKF-based visual-inertial odometry", International Journal of Robotics Research, May 2013, 2 pages, [retrieved on Aug. 22, 2016]. Retrieved from the Internet:<http://ijr.sagepub.com/content/32/6/690.abstract>.
(Continued)

*Primary Examiner* — Andrew W Johns
(74) *Attorney, Agent, or Firm* — HAYNES BEFFEL & WOLFELD LLP; Ernest J. Beffel, Jr.; Paul A. Durdik

(57) ABSTRACT

The described positional awareness techniques employing visual-inertial sensory data gathering and analysis hardware with reference to specific example implementations implement improvements in the use of sensors, techniques and hardware design that can enable specific embodiments to provide positional awareness to machines with improved speed and accuracy.

20 Claims, 21 Drawing Sheets

Related U.S. Application Data continuation of application No. 16/228,611, filed on Dec. 20, 2018, now Pat. No. 10,496,103, which is a continuation of application No. 15/658,279, filed on Jul. 24, 2017, now Pat. No. 10,162,362, which is a continuation-in-part of application No. 15/250,393, filed on Aug. 29, 2016, now Pat. No. 10,043,076.

(51) Int. Cl.

| | | |
|---|---|---|
| *G05D 1/02* | (2020.01) | |
| *G06T 7/73* | (2017.01) | |
| *G01C 21/10* | (2006.01) | |
| *G01S 5/16* | (2006.01) | |
| *H04N 13/261* | (2018.01) | |
| *G01C 21/00* | (2006.01) | |
| *G05D 1/00* | (2006.01) | |
| *G06T 7/579* | (2017.01) | |
| *G06V 10/46* | (2022.01) | |
| *G06V 20/10* | (2022.01) | |
| *G06V 20/20* | (2022.01) | |
| *G01C 21/16* | (2006.01) | |
| *G06F 18/22* | (2023.01) | |
| *H04N 23/60* | (2023.01) | |
| *H04N 23/73* | (2023.01) | |

(52) U.S. Cl.
CPC ............ *G01C 21/1656* (2020.08); *G01S 5/16* (2013.01); *G05D 1/0044* (2013.01); *G05D 1/027* (2013.01); *G05D 1/0246* (2013.01); *G05D 1/0251* (2013.01); *G05D 1/0253* (2013.01); *G05D 1/0274* (2013.01); *G06F 18/22* (2023.01); *G06T 7/579* (2017.01); *G06T 7/73* (2017.01); *G06V 10/464* (2022.01); *G06V 20/10* (2022.01); *G06V 20/20* (2022.01); *G06V 20/56* (2022.01); *H04N 13/261* (2018.05); *H04N 23/60* (2023.01); *H04N 23/73* (2023.01); *G06T 2207/10016* (2013.01); *G06T 2207/30244* (2013.01); *G06T 2207/30252* (2013.01); *Y10S 901/01* (2013.01)

(58) Field of Classification Search
CPC .......... G06T 2207/30244; G06V 10/40; G06V 10/462; G06V 10/464; G06V 10/761; G05D 1/0246; G05D 1/0251; G05D 1/0253; G01C 21/005; G01C 21/10; G01C 21/165

See application file for complete search history.

(56) References Cited

U.S. PATENT DOCUMENTS

| | | | |
|---|---|---|---|
| 8,655,094 B2 | 2/2014 | Miller et al. | |
| 8,774,517 B1 | 7/2014 | Khosla et al. | |
| 8,787,700 B1 | 7/2014 | Aly et al. | |
| 8,824,802 B2 | 9/2014 | Kutliroff et al. | |
| 8,825,391 B1 | 9/2014 | Urmson et al. | |
| 9,026,941 B1 | 5/2015 | Krueger et al. | |
| 9,058,563 B1 | 6/2015 | Krueger et al. | |
| 9,076,212 B2 | 7/2015 | Ernst et al. | |
| 9,280,576 B2 | 3/2016 | Trotta et al. | |
| 9,378,431 B2 | 6/2016 | Stoeffler et al. | |
| 9,519,289 B2 | 12/2016 | Munich et al. | |
| 9,607,428 B2 | 3/2017 | Li | |
| 9,751,210 B2 | 9/2017 | Fong et al. | |
| 9,836,653 B2 | 12/2017 | Schnittman | |
| 9,965,689 B2 | 5/2018 | dos Santos Mendonca et al. | |
| 10,032,276 B1 | 7/2018 | Liu et al. | |
| 10,043,076 B1 | 8/2018 | Zhang et al. | |
| 10,162,362 B2 | 12/2018 | Tsai et al. | |
| 10,222,805 B2 | 3/2019 | Munich et al. | |
| 10,395,117 B1 | 8/2019 | Zhang et al. | |
| 10,423,832 B1 | 9/2019 | Zhang et al. | |
| 10,496,103 B2 * | 12/2019 | Tsai et al. ............. | G05D 1/0251 |
| 10,571,925 B1 | 2/2020 | Zhang et al. | |
| 10,571,926 B1 | 2/2020 | Zhang et al. | |
| 10,755,428 B2 | 8/2020 | Aswin | |
| 10,769,440 B1 | 9/2020 | Zhang et al. | |
| 10,832,056 B1 | 11/2020 | Zhang et al. | |
| 10,983,527 B2 * | 4/2021 | Tsai et al. ............. | G06V 20/10 |
| 2007/0156286 A1 | 7/2007 | Yamauchi | |
| 2008/0249732 A1 | 10/2008 | Lee et al. | |
| 2009/0234499 A1 | 9/2009 | Nielsen et al. | |
| 2009/0285450 A1 | 11/2009 | Kaiser et al. | |
| 2010/0045701 A1 | 2/2010 | Scott et al. | |
| 2010/0121601 A1 | 5/2010 | Eckert | |
| 2010/0220173 A1 | 9/2010 | Anguelov et al. | |
| 2011/0044543 A1 | 2/2011 | Nakamura et al. | |
| 2011/0288684 A1 | 11/2011 | Farlow et al. | |
| 2012/0201469 A1 | 8/2012 | Livet et al. | |
| 2013/0282208 A1 | 10/2013 | Mendez-Rodriguez et al. | |
| 2013/0335554 A1 | 12/2013 | Brunner et al. | |
| 2014/0207282 A1 | 7/2014 | Angle et al. | |
| 2014/0369557 A1 | 12/2014 | Kayombya et al. | |
| 2015/0012209 A1 | 1/2015 | Park et al. | |
| 2015/0071524 A1 | 3/2015 | Lee | |
| 2015/0219767 A1 | 8/2015 | Humphreys et al. | |
| 2015/0268058 A1 | 9/2015 | Samarasekera et al. | |
| 2015/0369609 A1 | 12/2015 | Roumeliotis et al. | |
| 2016/0144511 A1 * | 5/2016 | Romanov et al. ... | G05D 1/0253 701/28 |
| 2016/0188977 A1 | 6/2016 | Kearns et al. | |
| 2016/0209217 A1 | 7/2016 | Babu et al. | |
| 2016/0246302 A1 | 8/2016 | Liao et al. | |
| 2016/0327653 A1 | 11/2016 | Humphreys et al. | |
| 2016/0364835 A1 | 12/2016 | Srebnik et al. | |
| 2017/0010109 A1 | 1/2017 | Hayon et al. | |
| 2017/0028556 A1 | 2/2017 | Summer et al. | |
| 2017/0089948 A1 | 3/2017 | Ho et al. | |
| 2017/0157769 A1 | 6/2017 | Aghamohammadi et al. | |
| 2017/0206418 A1 | 7/2017 | Schnittman | |
| 2017/0277197 A1 | 9/2017 | Liao et al. | |
| 2017/0357873 A1 | 12/2017 | Roimela et al. | |
| 2018/0035606 A1 | 2/2018 | Burdoucci | |
| 2018/0074508 A1 | 3/2018 | Kleiner et al. | |
| 2018/0082128 A1 | 3/2018 | Cameron et al. | |
| 2018/0158197 A1 | 6/2018 | Dasgupta et al. | |
| 2018/0188032 A1 | 7/2018 | Ramanandan et al. | |
| 2018/0224286 A1 | 8/2018 | Pickering et al. | |
| 2018/0239355 A1 | 8/2018 | Lee et al. | |
| 2019/0025851 A1 | 1/2019 | Ebrahimi Afrouzi | |
| 2019/0197769 A1 | 6/2019 | Khosrowpour | |
| 2020/0241554 A1 | 7/2020 | Takahashi et al. | |

FOREIGN PATENT DOCUMENTS

| | | |
|---|---|---|
| CN | 107153247 A | 9/2017 |
| CN | 107235013 A | 10/2017 |
| CN | 107241441 A | 10/2017 |
| CN | 107273881 A | 10/2017 |
| CN | 107291080 A | 10/2017 |
| CN | 107323301 A | 11/2017 |
| CN | 107329478 A | 11/2017 |
| CN | 107444179 A | 12/2017 |
| CN | 107451611 A | 12/2017 |
| CN | 107462892 A | 12/2017 |
| CN | 107562660 A | 1/2018 |
| CN | 206932609 U | 1/2018 |
| CN | 206932645 U | 1/2018 |
| CN | 206932646 U | 1/2018 |
| CN | 206932647 U | 1/2018 |
| CN | 206932653 U | 1/2018 |
| CN | 206932676 U | 1/2018 |
| CN | 206932680 U | 1/2018 |
| CN | 206932902 U | 1/2018 |
| CN | 206935560 U | 1/2018 |
| CN | 206946068 U | 1/2018 |
| CN | 207070610 U | 3/2018 |
| CN | 207070612 U | 3/2018 |
| CN | 207070613 U | 3/2018 |

(56) References Cited

FOREIGN PATENT DOCUMENTS

| | | | |
|---|---|---|---|
| CN | 207070619 U | 3/2018 |
| CN | 207070621 U | 3/2018 |
| CN | 207070629 U | 3/2018 |
| CN | 207070630 U | 3/2018 |
| CN | 207070638 U | 3/2018 |
| CN | 207070639 U | 3/2018 |
| CN | 207070641 U | 3/2018 |
| CN | 207070652 U | 3/2018 |
| CN | 207070703 U | 3/2018 |
| CN | 207070709 U | 3/2018 |
| CN | 207070710 U | 3/2018 |
| CN | 207071933 U | 3/2018 |
| CN | 207073092 U | 3/2018 |
| CN | 207074202 U | 3/2018 |
| CN | 207074269 U | 3/2018 |
| CN | 207074560 U | 3/2018 |
| CN | 207151236 U | 3/2018 |
| CN | 207151465 U | 3/2018 |
| CN | 207152927 U | 3/2018 |
| CN | 207154149 U | 3/2018 |
| CN | 207154238 U | 3/2018 |
| CN | 207155071 U | 3/2018 |
| CN | 207155773 U | 3/2018 |
| CN | 207155774 U | 3/2018 |
| CN | 207155775 U | 3/2018 |
| CN | 207155776 U | 3/2018 |
| CN | 207155817 U | 3/2018 |
| CN | 207155818 U | 3/2018 |
| CN | 207155819 U | 3/2018 |
| CN | 207155840 U | 3/2018 |
| CN | 207155841 U | 3/2018 |
| CN | 207157464 U | 3/2018 |
| CN | 207158940 U | 3/2018 |
| CN | 207159724 U | 3/2018 |
| CN | 207159810 U | 3/2018 |
| CN | 207159811 U | 3/2018 |
| CN | 207159812 U | 3/2018 |
| CN | 207159840 U | 3/2018 |
| CN | 207159970 U | 3/2018 |
| CN | 207160626 U | 3/2018 |
| CN | 207164589 U | 3/2018 |
| CN | 207164772 U | 3/2018 |
| CN | 107958285 A | 4/2018 |
| CN | 107958451 A | 4/2018 |
| CN | 07328169 U | 5/2018 |
| CN | 107976999 A | 5/2018 |
| CN | 108010271 A | 5/2018 |
| CN | 207321871 U | 5/2018 |
| CN | 207321872 U | 5/2018 |
| CN | 207321889 U | 5/2018 |
| CN | 207322208 U | 5/2018 |
| CN | 207322217 U | 5/2018 |
| CN | 207328170 U | 5/2018 |
| CN | 207328818 U | 5/2018 |
| CN | 207328819 U | 5/2018 |
| CN | 207336762 U | 5/2018 |
| CN | 207354913 U | 5/2018 |
| CN | 207356393 U | 5/2018 |
| CN | 207356394 U | 5/2018 |
| CN | 207356420 U | 5/2018 |
| CN | 207356421 U | 5/2018 |
| CN | 207356422 U | 5/2018 |
| CN | 207356963 U | 5/2018 |
| CN | 207359050 U | 5/2018 |
| CN | 207360243 U | 5/2018 |
| CN | 207367052 U | 5/2018 |
| CN | 207367336 U | 5/2018 |
| CN | 207369157 U | 5/2018 |
| CN | 207443447 U | 6/2018 |
| CN | 207443493 U | 6/2018 |
| EP | 3224649 A1 | 10/2017 |
| JP | 2017053820 A | 3/2017 |
| JP | 2017538208 A | 12/2017 |
| WO | 2012040644 A1 | 3/2012 |
| WO | 2016085717 A1 | 6/2016 |

OTHER PUBLICATIONS

Mur-Artal, et al., ORB-SLAM: A Versatile and Accurate Monocular SLAM System, abstract, IEEE Transactions on Robotics, 2015. vol 31, Issue 5, 2 pages, [retrieved on Aug. 22, 2016], Retrieved from the Internet:< >.

Rublee et al., "ORB: An efficient alternative to SIFT or SURF." Computer Vision (ICCV), 2011 IEEE international conference on. IEEE, 2011, 8 pages.

How Oculus Rift works: Everything you need to knowabout the VR sensation, 15-pages, [retrieved on Jul. 8, 2016]. Retrieved from the Internet:<http://www.wareable.com/oculus-rift/how-oculus-rift-works>.

ORB Feature Detector and Binary Descriptor, http://scikit-image.org/docs/dev/auto_examples/features_detection/plot_orb.html (accessed Feb. 13, 2018), 3 pages.

OpenCV—Camera Calibration and 3D Reconstruction, Open Source Computer Vision, https://docs.opencv.org/master/d9/d0c/group_calib3d.html (accessed Feb. 13, 2018), 50 pages.

EP 18182408.7—Extended European Search Report dated Nov. 21, 2018, 12 pages.

Cadena et al., "Past Present, and Future of Simultaneous Localization and Mapping: Toward the Robust-Perception Age", IEEE Transactions on Robotics, IEEE Service Center, Piscataway, NJ, US, vol. 32, No. 6, Dec. 1, 2016, pp. 1309-1332 (Part 1 of 2).

EP 18184739.3—Extended Search Report dated Jan. 30, 2019, 8 pages.

EP 18184739.3—Response to Extended Search Report dated Jan. 30, 2019, as filed Aug. 21, 2019, 23 pages.

CN-201810818972.X, Request for Examination Filed Jul. 17, 2020, 16 pages of with English translation.

EP 18184739.3—Communication under Rule 71(3) dated Jul. 22, 2020, 93 pages.

Multilateration—Wikipedia, http://en.wikipedia.org/w/index.php?title=Multilateration&oldid=523281858, accessed Mar. 8, 2018, 5 pages.

Wahba, "A least squares estimate of satellite attitude," SIAM review 7, No. 3 (1965): 409-409.

EP 18182408.7—Response to Extended European Search Report dated Nov. 21, 2018, as filed Jun. 27, 2019, 24 pages.

EP 18182408.7—Communication under Rule 71(3) dated Sep. 29, 2020, 79 pages.

Cadena et al., "Past Present, and Future of Simultaneous Localization and Mapping: Toward the Robust-Perception Age", IEEE Transactions on Robotics, IEEE Service Center, Piscataway, NJ, US, vol. 32, No. 6, Dec. 1, 2016, pp. 1309-1332 (Part 2 of 2).

* cited by examiner

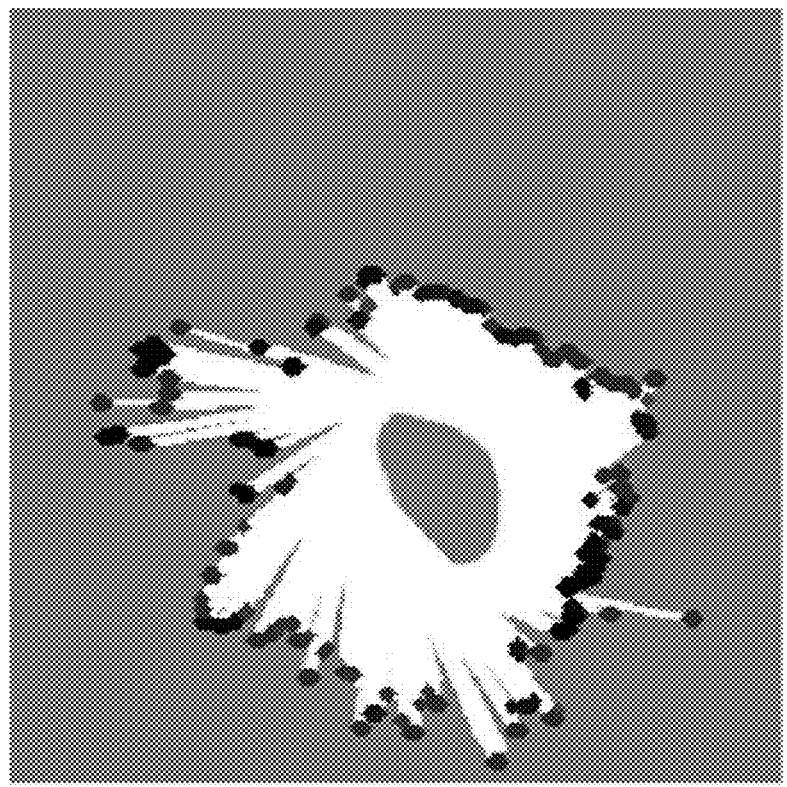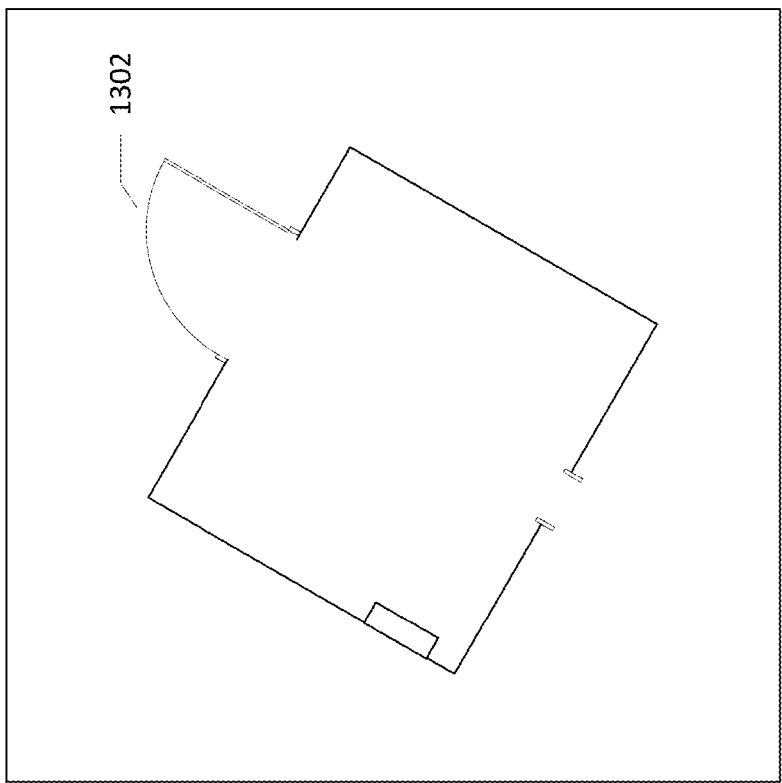
FIG. 13

FAULT-TOLERANCE TO PROVIDE ROBUST TRACKING FOR AUTONOMOUS AND NON-AUTONOMOUS POSITIONAL AWARENESS

CROSS-REFERENCE TO OTHER APPLICATIONS

This application is a continuation of U.S. patent application Ser. No. 16/697,094, entitled, "FAULT TOLERANCE TO PROVIDE ROBUST TRACKING FOR AUTONOMOUS POSITIONAL AWARENESS" filed Nov. 26, 2019, which is a continuation of U.S. patent application Ser. No. 16/228,611, entitled, "FAULT TOLERANCE TO PROVIDE ROBUST TRACKING FOR AUTONOMOUS POSITIONAL AWARENESS" filed Dec. 20, 2018, which is a continuation of U.S. patent application Ser. No. 15/658,279, entitled, "FAULT TOLERANCE TO PROVIDE ROBUST TRACKING FOR AUTONOMOUS POSITIONAL AWARENESS" filed Jul. 24, 2017, which is a continuation-in-part of U.S. patent application Ser. No. 15/250,393, entitled, "VISUAL-INERTIAL POSITIONAL AWARENESS FOR AUTONOMOUS AND NON-AUTONOMOUS TRACKING" filed Aug. 29, 2016.

The following U.S. patent applications are incorporated by reference herein: U.S. Nonprovisional application Ser. No. 15/250,419, entitled, "VISUAL-INERTIAL POSITIONAL AWARENESS FOR AUTONOMOUS AND NON-AUTONOMOUS DEVICE", filed Aug. 29, 2016, and U.S. Nonprovisional application Ser. No. 15/250,581, entitled, "VISUAL-INERTIAL POSITIONAL AWARENESS FOR AUTONOMOUS AND NON-AUTONOMOUS MAPPING", filed Aug. 29, 2016.

FIELD OF THE TECHNOLOGY DISCLOSED

The technology disclosed generally relates to detecting location and positioning of a mobile device, and more particularly relates to application of visual processing and inertial sensor data to positioning and guidance technologies.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Autonomous robots have long been the stuff of science fiction fantasy. One technical challenge in realizing the truly autonomous robot is the need for the robot to be able to identify where they are, where they have been, and where they plan on going. Traditional SLAM techniques have improved greatly in recent years; however, there remains considerable technical challenge to providing fast accurate and reliable positional awareness to robots and self-guiding mobile platforms.

With the recent proliferation of virtual reality headsets such as the Oculus PlayStation™ VR, Samsung Gear™ VR, the HTC Vive™, and others, a new class of devices—one that is not autonomous but rather worn by a human user— that would benefit from fast, accurate and reliable positional information has arisen. Many technical challenges remain however in the field of enabling machines and devices to identify where they are, where they have been and plan where they are going. On especially challenging area involves recognizing a location and obstructions accurately and quickly. A variety of different approaches have been tried. For example RFID/WiFi approaches have proven to be expensive and of limited accuracy. Depth sensor based approaches have been found to be high cost and suffer from power drain and interference issues. Marker based approaches require markers placed within the work area— limiting the useful area in which the device can operate. Visual approaches currently are slow leading to failure when used in fast motion applications. Such approaches can also suffer scale ambiguity. Yet these implementations failed to live up to the standards required for widespread adoption.

The challenge of providing fast reliable affordable positional awareness to devices heretofore remained largely unsolved.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 13 illustrates an example of an occupancy grid map in one implementation.

DESCRIPTION

Figure 1:
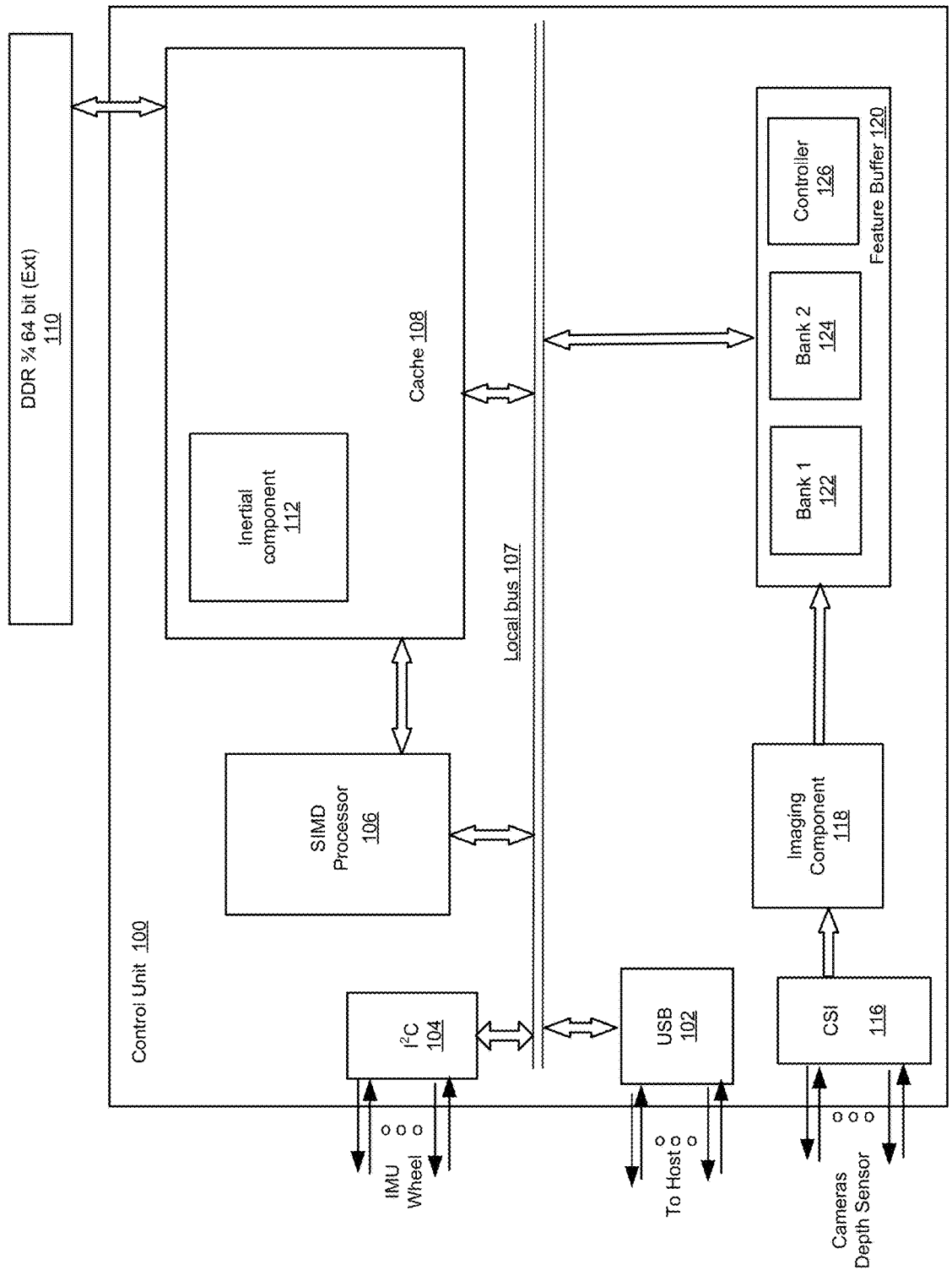
FIG. 1 illustrates an example of a control unit for a visual-inertial sensor.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

This document describes positional awareness techniques employing visual-inertial sensory data gathering and analysis hardware with reference to specific example implementations. The discussion is organized as follows. First, an introduction describing some of the problems addressed by various implementations will be presented. Then, a high-level description of one implementation will be discussed at an architectural level. Next, the processes used by some implementations to efficiently process image and inertial data are discussed. Lastly, the technology disclosed will be illustrated with reference to particular applications of (i) robots and self-guided autonomous platforms, (ii) virtual reality headsets and wearable devices, and (iii) augmented reality headsets and wearable devices. The references to specific examples are intended to be illustrative of the approaches disclosed herein rather than limiting.

Improvements in the use of sensors, techniques and hardware design can enable specific implementations to provide improved speed and accuracy, however, such improvements come with an increased number of parameters and significant memory and computational requirements. Conventional approaches to automatic guidance have largely focused on single sensor input. Camera based approaches have been relatively accurate, but suffer speed limitations (most hardware provide 30 fps, 60 fps at most), and are computationally expensive since these approaches process every pixel. Inertial guidance based approaches suffer from drift of the zero or origin point. Further, these approaches require expensive hardware in order to achieve useful results. WIFI and RFID approaches based on older technology exist; however, these have shown themselves to be limited in capability. Depth sensor based approaches are expensive. Furthermore, these approaches require active sensing, so the computational cost is relatively high. Finally, the device's active sensing can pose interference issues.

To overcome the computational burden of processing large amounts of image data all the time, inertial data from a multi-axis inertial measurement unit (IMU) can be used to estimate changes in the environment due to changes in pose of the machine under guidance. A multi-axis inertial measurement unit measures and reports the machine's linear acceleration using one or more accelerometers and rotational rate using one or more gyroscopes. To overcome the drift problems associated with inertial sensors, images can be captured and processed to correct and update pose estimates made based upon inertial data. However, the machine under guidance can have unsuccessful image updates due to hardware or software malfunctions of the cameras, blurred image due to sudden movement of the machine, obstruction of view, low illumination of the surrounding environment, etc. In instances where the machine under guidance has unsuccessful image updates, inertial data can be used to estimate the change in pose. In some implementations, the machine under guidance can also estimate its current pose by keeping a window of past readings of visual data, inertial data and tracking poses. In some implementations, to overcome the drift problems associated with inertial sensors, a motion detector is used to decide whether the machine under guidance has moved to a new location and whether the inertial data can be used to estimate the change in pose.

Further, stereo imaging sensors comprised of RGB and grayscale camera combinations can provide stereo imaging capabilities, at lower cost points than stereo RGB systems. Yet further, using low-end sensors to construct a sensor, e.g., cameras having resolution of 640×480, obviates the cost of high-end image sensors. Still further, use of a low-power Control Unit to perform certain sensor based processing, instead of a powerful processor of a host or the machine under guidance, enables use of the system at reduced cost relative to conventional approaches. Implementations can be deployed in a variety of usage scenarios, including robot or other mobile platform guidance, Virtual Reality/Augmented Reality (VR/AR) headsets, goggles or other wearable devices, and others.

Examples of robot applications that benefit from employing positional awareness techniques such as described herein include:

Caregiver and service robots (traveling on a ground plane).

A robot vacuuming/mopping/cleaning the floor.

A robot being commanded to carry objects around the environment.

A telepresence robot moving around a remote environment automatically.

A robot butler that follows a person around.

In each of the scenarios listed above, the robot utilizes the techniques described herein in order to track its own location and to recognize the objects that it encounters. Also, since the robot performs many complex tasks, each with real-time constraints, it is beneficial that the sensing be done rapidly to accelerate the perception pipeline. To overcome the computational burden imposed by this processing, implementations offload some computation from the main processor to the visual-inertial sensor module. In addition, since it is a mobile robot, which carries limited battery, energy consumption is a major challenge. Accordingly, some implementations offload some computational tasks from the main processor to a low-power sensor module, thereby enabling implementations to achieve overall energy efficiency. Since cost is an issue in mobile robots, because lowering the cost of the robot makes the robot affordable to more customers, cost reduction is another factor for sensor design. Accordingly, some implementations employ one low-cost grayscale sensor that is used for localization tasks, and one colored sensor for recognition tasks. This design point enables these implementations to significantly reduce the cost over a stereo colored sensor designs without sacrificing performance.

Virtual Reality (VR) and Augmented Reality (AR) scenarios require a wearable headset to track its own location, and maybe to recognize the objects that it encounters. In order to track its location, the wearable headset is equipped with a positional self-aware device that senses its own movement through a stereo inertial hardware sensor.

Accordingly, the sensor generates reliable inertial data so that the tracking and mapping pipeline that follows can accurately infer the device's—and hence the headset's—location.

In implementations in which the device is embedded within another device, e.g., robot, mobile platform, wearable computer, AR/VR headset, goggles, wrist or other watches, etc., limited computational resources are available, while the workload of robot guidance, or AR/VR processing demands real-time performance, sensing is done rapidly to accelerate the perception processing pipeline. Accordingly, some implementations achieve these goals by offloading some computation from the main processor to the sensor module.

In addition, in AR/VR applications the mobile embedded device carries limited battery power, making energy consumption a challenge. Accordingly, some implementations offload some computation from the main processor to the low-power sensor module, in order to achieve overall energy efficiency.

Yet further, cost is an issue in many AR/VR applications because as the cost of the device is lowered, the potential to reach more customers is expanded. Hence cost is another factor for the sensor module design. Accordingly, some implementations use one low-cost grayscale sensor for localization tasks, and one colored sensor for recognition tasks. This design can provide significantly reduced cost over a stereo colored sensor design without sacrificing performance.

Examples of systems, apparatus, and methods according to the disclosed implementations are described in a robot guidance, VR and AR wearable device contexts with image and inertial data. In other instances, the technology disclosed can be applied to autonomous vehicle guidance technology, navigation, telecommunications systems, financial systems, security trading, banking, business intelligence, marketing, mining, energy, etc. and using sonar, audio, and LIDAR data. Other services are possible, such that the following examples should not be taken as definitive or limiting either in scope, context, or setting.

The technology disclosed relates to improving utilization of computing resources such as computational power and memory use during processing of image and inertial data inside a single input-multiple data (SIMD) architecture. The technology disclosed can be implemented in the context of any computer-implemented system including a reduced instruction set (RISC) system, emulated hardware environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented in the context of any computer-implemented system like a NEON ARM VFP9-S processor, an ARM core processor, or a compatible processor implementation.

In addition, the technology disclosed can be implemented using a variety of different imaging sensors and technologies, including RGB, grayscale, binary (e.g., digital image subjected to threshold intensity level), IR, sonar, LIDAR or combinations thereof.

System Overview

Stereo Visual-Inertial Sensor

FIG. 1 illustrates an example of a Control Unit for a visual-inertial sensor in block diagram format. Control Unit 100 in FIG. 1 can be coupled to an external memory 110, a flash memory (not shown in FIG. 1 for clarity sake), and one or more persistent storages such as HDDs, optical drives or the like (also not shown in FIG. 1 for clarity sake). Control Unit 100 includes a memory cache 108, a USB I/O port 102, a Camera Serial Interface (CSI) I/O port 116, that facilitates directly receiving images from cameras (not shown in FIG. 1 for clarity sake) by imaging component 118, an Inter-Integrated Circuit (I2C) I/O ports 104, a single instruction multiple-data (SIMD) capable processor 106, and a feature buffer 120. The components in the Control Unit 100 are intercoupled by a local bus 107. In an embodiment, the external memory 110 is a 64-bit double data rate (DDR) random access memory (RAM). In an embodiment, the SIMD capable processor 106 is implemented as a reduced instruction set computer (RISC) architecture. In an embodiment, the SIMD capable processor 106 is implemented as a NEON ARM VFP9-S. An inertial component 112 resides within the memory cache 108.

Figure 2:
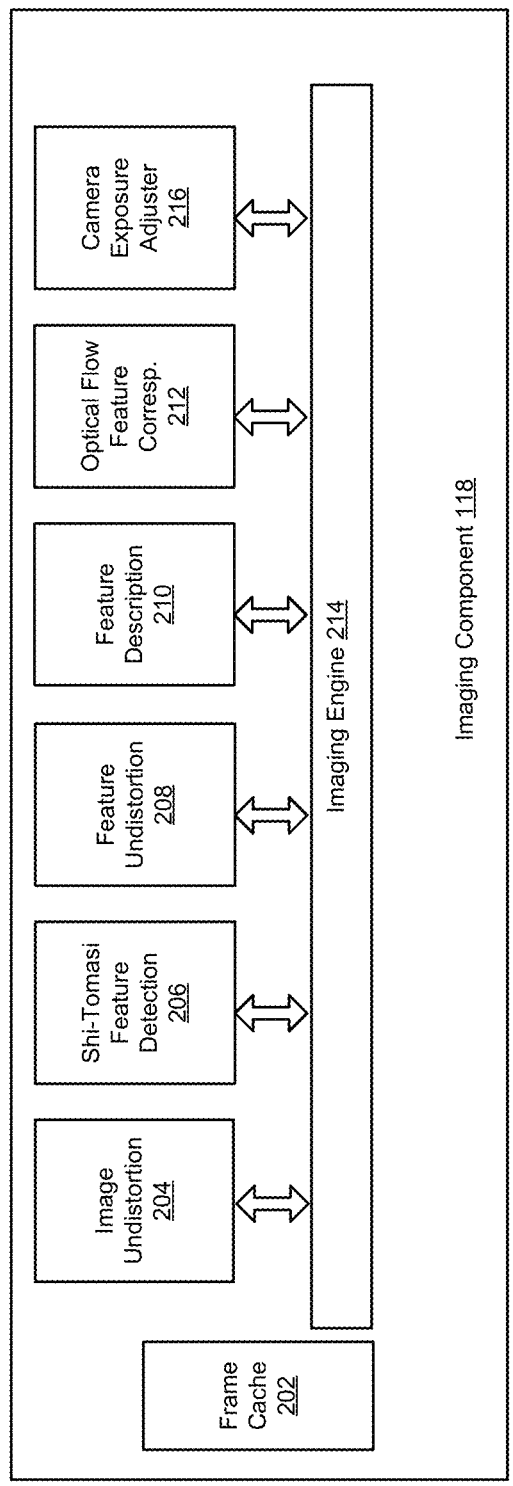
FIG. 2 illustrates an example of an imaging component in FIG. 1.

FIG. 2 illustrates an example of an imaging component 118 in FIG. 1. An Imaging component 118 includes a direct memory access (DMA) 202, an image undistortion processor 204, a Shi-Tomasi processor 206, a feature undistortion processor 208, a feature description engine 210, an optical flow feature correspondence processor 212, and a camera exposure adjuster 216 under control of an Imaging Engine 214.

The camera exposure adjuster 216 dynamically adjusts the exposure value of the visual sensors. In one implementation, camera exposure adjuster 216 adjusts the exposure value when it discovers that the number of 2D features detected in an image is lower than a feature threshold. In one implementation, the feature threshold can be 50. In one implementation, the exposure value of the visual sensor can be adjusted by turning on the auto-exposure capability of the cameras. Of course, other implementations in which exposure value of the visual sensors can be adjusted will be readily apparent to those skilled in the art.

If each incoming image from the visual sensors or cameras through Camera Serial Interface (CSI) I/O port 116 is at least 3 MB and 30 images per second are captured, then there is at least 90 MB of memory allocation per second for the incoming images. To process the rather large amount of visual data with a short period of time, frames captured by the camera in the visual-inertial sensor can be directly processed by the imaging component 118 to extract useful corner features and generates a descriptor for each feature. Imaging component 118 can be implemented as a Digital Signal Processor (DSP). The imaging component 118 directly processes the incoming images without involving the SIMD processor 106 or storing the image data in the cache 108. In some implementations, the incoming image size is at least 2 MB. In some implementations, the incoming image size is at least 1 MB. In some implementations, the images may be arriving at the rate of 20 images per second through the Camera Serial Interface (CSI) I/O port.

After the incoming images are analyzed and key features are extracted by the imaging component 118, a feature buffer 120 stores the extracted features. In some implementations, the feature buffer includes banks to contain 2-5 KB of feature data per image frame. In some implementations, the feature buffer includes banks to contain 1-10 KB of feature data per image frame. The feature buffer 120 comprises of bank 1 122, bank 2 124 and a feature buffer controller 126.

Figure 3:
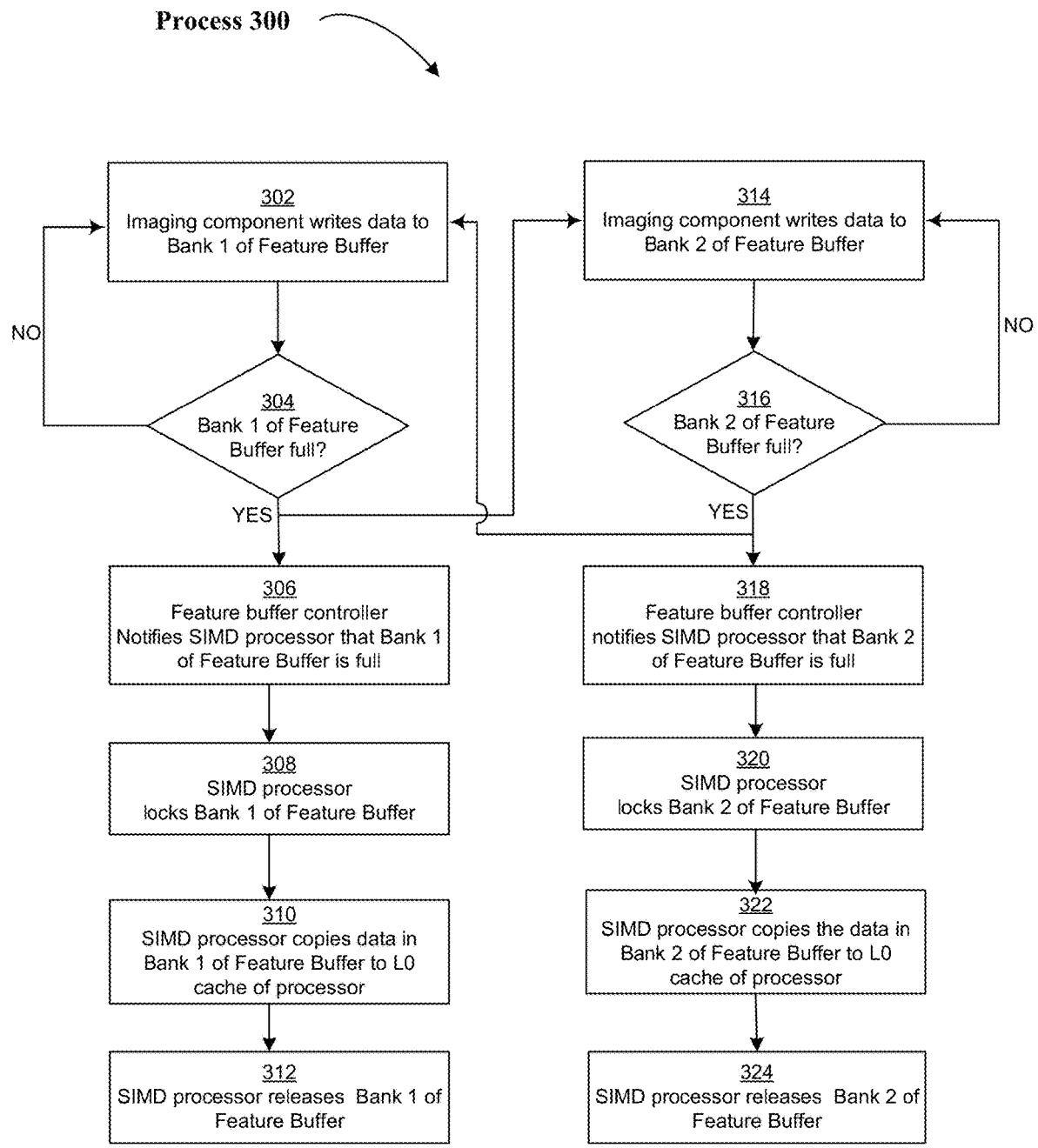
FIG. 3 illustrates a method of operation of the feature buffer in FIG. 1.

FIG. 3 illustrates a method of operation 300 of the feature buffer 120. The imaging component 118 can write data to either bank 1 (action 302) or bank 2 (action 314), but not concurrently. If the imaging component 118 is currently writing data to bank 1 and bank 1 becomes full (action 304), the feature buffer controller 126 notifies the SIMD processor 106 (action 306) that bank 1 is full. Meanwhile, the imaging component 118 starts writing data to bank 2 (action 314). The SIMD processor locks bank 1 (action 308), copies the data in bank 1 to the L0 cache available inside the SIMD processor (action 310), and releases bank 1 (action 312). If bank 2 becomes full (action 316), the feature buffer controller 126 notifies the SIMD processor 106 about the filled bank 2 (action 318), and the imaging component 118 starts writing data to bank 1 (action 302). The SIMD processor locks bank 2 (action 320), copies the data in bank 2 to the L0 cache available inside the SIMD processor (action 322), and releases bank 2 (action 324). Of course other implementations in which additional banks are employed will be readily apparent to those skilled in the art.

Figure 4:
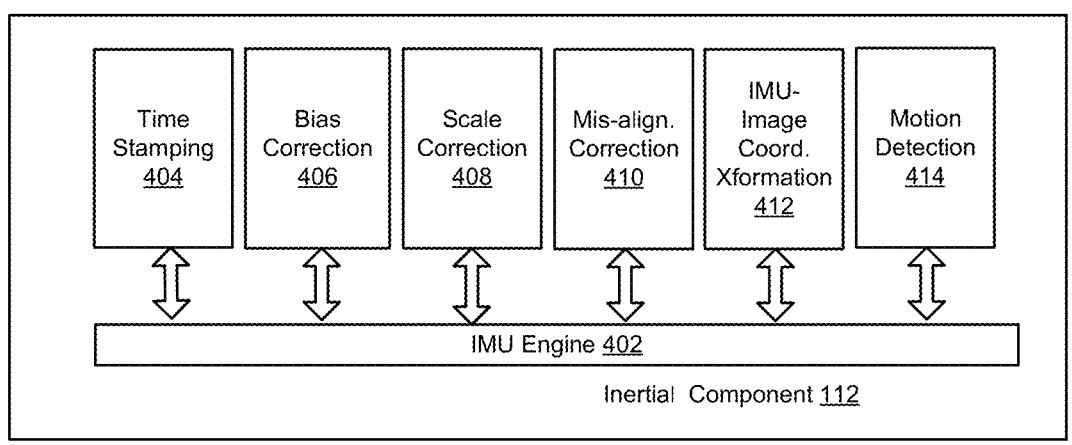
FIG. 4 illustrates an example of an inertial component in FIG. 1.

FIG. 4 illustrates an example of an inertial component 112 in FIG. 1. The Inertial component 112 includes an Inertial Measurement engine 402 that implements a time stamping processor 404 that time stamps sets of inertial data from an inertial sensor (not shown in FIG. 1 for clarity sake), a bias correction processor 406 that corrects data readout from the timestamped inertial data, a scale correction processor 408 that applies stored scale factor information to the corrected inertial data, a mis-alignment correction processor 410 that corrects misalignments of sensory elements of the inertial measurement sensor, and an IMU-Image coordinate transformation processor 412 that computes transformations describing differences between a frame of reference of the inertial data and a frame of reference of the image data. In some implementations, the inertial component 112 can further include a motion detection processor 414 that maintains a window of readings from the accelerometer of the inertial measurement unit, and computes the variances of the accelerometer readings. The motion detector 414 determines whether the mobile device is "moving" or "static" according to the computed variances from the accelerometer readings.

Visual-Inertial Sensor

Figure 5:
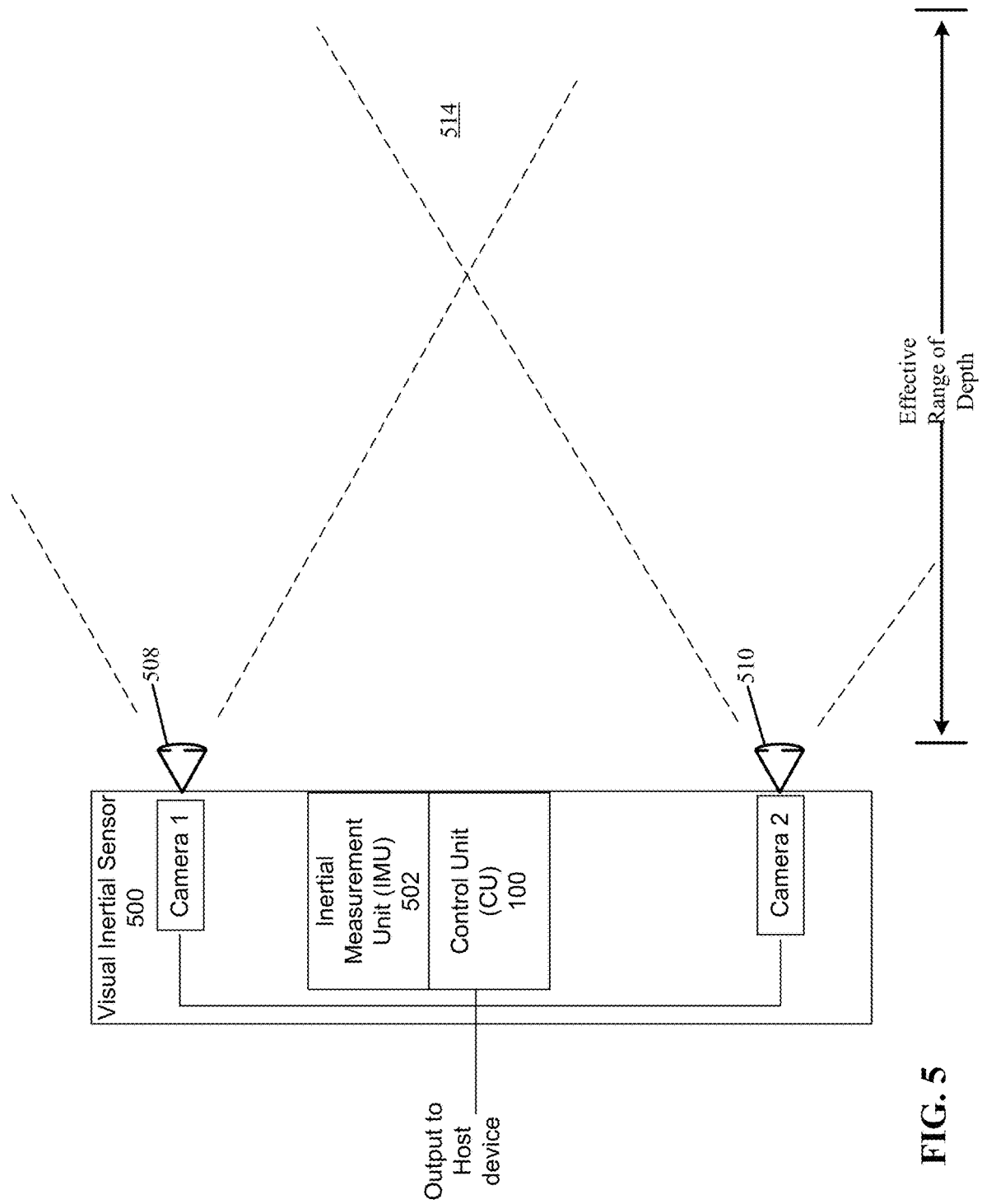
FIG. 5 illustrates an example of a visual-inertial sensor in which techniques described herein can be embodied.

FIG. 5 illustrates an example visual-inertial sensor implementation configured for determining positional information. Visual-inertial sensor 500 includes camera 1 508, camera 2 510, an Inertial Measurement Unit (IMU) 502, and a Computation Unit (CU) 100, having a USB interface to provide output to a host. Cameras 508, 510 include at least partially overlapping fields of view to provide a stereoscopic capable portion 514 within an effective range of depth of view of the visual-inertial sensor 500. Using cameras 508, 510, enables visual-inertial sensor 500 to generate image depth information, which is useful for agent localization tasks (including tracking, localization, map generation, and relocalization). In a representative implementation illustrated by FIG. 5, cameras 508 and 510 are used mainly for agent localization that extracts features from images and to provide a plurality of functions: firstly, to extract features from images in agent localization, and secondly, to provide raw information for deep learning based tasks, including object recognition, object tracking, image captioning, and the like.

An IMU 502 provides raw sensor data for agent localization pipeline, which consumes IMU data at a high frequency (>200 Hz) to generate agent positional information in real-time. In an implementation, the localization pipeline combines information from IMU 502 which runs at relatively high frequency to provide frequent updates of less accurate information, and, which run at relatively lower frequency, 30 Hz, to provide more accurate information with less frequency.

The Control Unit 100 performs control of the sensors, IMU 502 and cameras 508, 510, time stamping sensor data from the sensors, performs pre-computation in order to accelerate the localization pipeline, and packages raw data for sending over USB 102 to a host.

The USB interface 102 enables the visual-inertial sensor 500 to interact with a host. The host (not shown in FIG. 5 for clarity sake) can be a mobile device or a desktop/laptop computer, specialized machine controller, automobile control module, robot controller or the like, that consumes the data generated by the visual-inertial sensor 500. In various implementations, the host can perform additional computation to achieve agent localization and deep learning tasks. Implementations that perform data pre-processing on low-power CU 100 relieve the host processor (which has a much higher power consumption compared to low-power CU) from performing these tasks. As a result, such implementations achieve increased energy efficiency.

Note that one implementation averages the aligned images. In other implementations, other techniques are used. Also note that in another implementation an image quality measurement sub-step is included. So if the output image is too dark or still not sharp or clear enough, the image will be rejected and not passed to the rest of the pipeline.

Sensor Inertial Data Generation and Processing

In an embodiment, IMU raw data is corrected on the CU 100, thereby enabling implementations that do not require extra processing from the host processor, therefore accelerating the sensor pre-processing pipeline.

Time Stamping:

The time stamping processor 404 time stamps each set of inertial measurement data that the control unit 100 receives from the IMU sensor 502 data, in order to assure that the visual-inertial sensor 500 maintains a temporally accurate stream of sensor data. Such rigorous attention to maintaining the integrity of the sensor data stream enables implementations to provide agent localization that works reliably. Time-stamping raw data by the visual-inertial sensor obviates the need for complex synchronization tasks. The time stamping processor 404 is further configured for performing time synchronization with the host processor of the mobile unit, which may have a different clock than the control unit 100. The time stamping processor 404 also accounts for data transfer delay between the IMU 502, the control unit 100, cameras 508, 510, and the host processor of the mobile unit. The discrepancy in time stamps for the of inertial measurement data due to different clocks and data transfer delay is corrected by the time stamping processor 404 by adding a constant offset or adjusting for the transfer delay.

Bias Correction:

The bias correction processor 406 corrects IMU data readout from the timestamped inertial data. Due to manufacturing imperfections, IMU sensors usually have bias problems such that its measurements contain errors. A bias error, if not removed from the measurement, is integrated twice as part of the mechanization process. In this case, a constant bias (error) in acceleration becomes a linear error in velocity and a quadratic error in position. A constant bias in attitude rate (gyro) becomes a quadratic error in velocity and a cubic error in position. The bias can be derived from the offline factory sensor calibration stage. This calibration information in CU 100 to perform bias correction task on CU 100.

Scale Correction:

The scale correction processor 408 applies stored scale factor information to the corrected inertial data. Scale factor error is the relation between input and output. If the input is 100%, the expected output is 100%. The actual output is the result of a linear effect, where the output is proportional to the input but scaled. For example, if the input is 10 m/s2, but there is a 2% scale factor error, the output measurement is 10.2 m/s2. The scale factor can be derived from the offline factory sensor calibration stage. This calibration information in CU 100 to perform scale correction task on CU 100.

Misalignment Correction:

The mis-alignment correction processor 410 corrects misalignments of sensory elements of the inertial measurement sensor. There are three gyroscopes and three accelerometers are mounted orthogonal to each other. The mountings, however, have errors and so are not perfectly 90 degrees. This leads to a correlation between sensors. For example, assume one axis is pointed perfectly up and the IMU is level. The accelerometer on this axis is measuring gravity. If the other two axes were perfectly orthogonal, they do not measure any of the effect of gravity. If there is a non-orthogonality, the other axes also measure gravity, leading to a correlation in the measurements. The effect of non-orthogonality occurs within sensor sets (between accelerometers or gyroscopes), between sensor sets or between the sensor sets and the enclosure (package misalignment). Careful manufacturing, as well as factory calibration, can help minimize this error source. Continuous estimation and correction during system operation is also an approach used to minimize this effect. Package misalignment (between the IMU 502 and the enclosure) can be removed by performing a bore-sighting estimation to determine the offset between the IMU 502 measurement frame and the sensor (objective) frame. The misalignment numbers can be derived from the offline factory sensor calibration stage. This calibration information in CU 100 to perform misalignment correction task on CU 100.

Movement Detection:

Accelerometers in a multi-axis IMU will be perturbed by some thermo-mechanical noise which fluctuates at a rate much greater than the sampling rate of the sensor. As a result, the inertial data readings obtained from the multi-axis IMU will include white noise. Therefore, inertial data from the IMU will predict that the mobile unit has traveled a significant distance even when it is static. The motion detection processor 414 maintains a window of time-dependent accelerometer readings from the IMU, and computes the time-dependent variance from the accelerometer readings. In one implementation, the motion detection processor 414 keeps a record of accelerometer readings for 0.5 to 1 second. Thus, for a 200 Hz IMU, the window size for the window of time-dependent accelerometer readings is 100-200 samples.

The motion detection processor 414 determines whether the mobile unit is "moving" or "static" according to the computed variance. If the variance is greater than a threshold, the mobile unit is said to be "moving." If the variance is smaller than a threshold, the mobile unit is said to be "static." In one implementation, the threshold variance can be determined by the heuristic evaluation by the system designer. If the motion detection processor 414 determines that the mobile unit is "moving," the new pose of the mobile unit can be estimated from the inertial data readings from the accelerometers of the IMU. In one implementation, if the motion detection processor 414 determines that the mobile unit is "static," the new pose of the mobile unit can be estimated by assuming zero velocity. In one implementation, if the motion detection processor 414 determines that the mobile unit is "static," a white noise can be added to the previous pose of the mobile unit to determine a new pose. In another implementation, if the motion detection processor 414 determines that the mobile unit is "static," the heading orientation of the mobile unit can be updated based on the gyroscope readings from the IMU.

Figure 6:
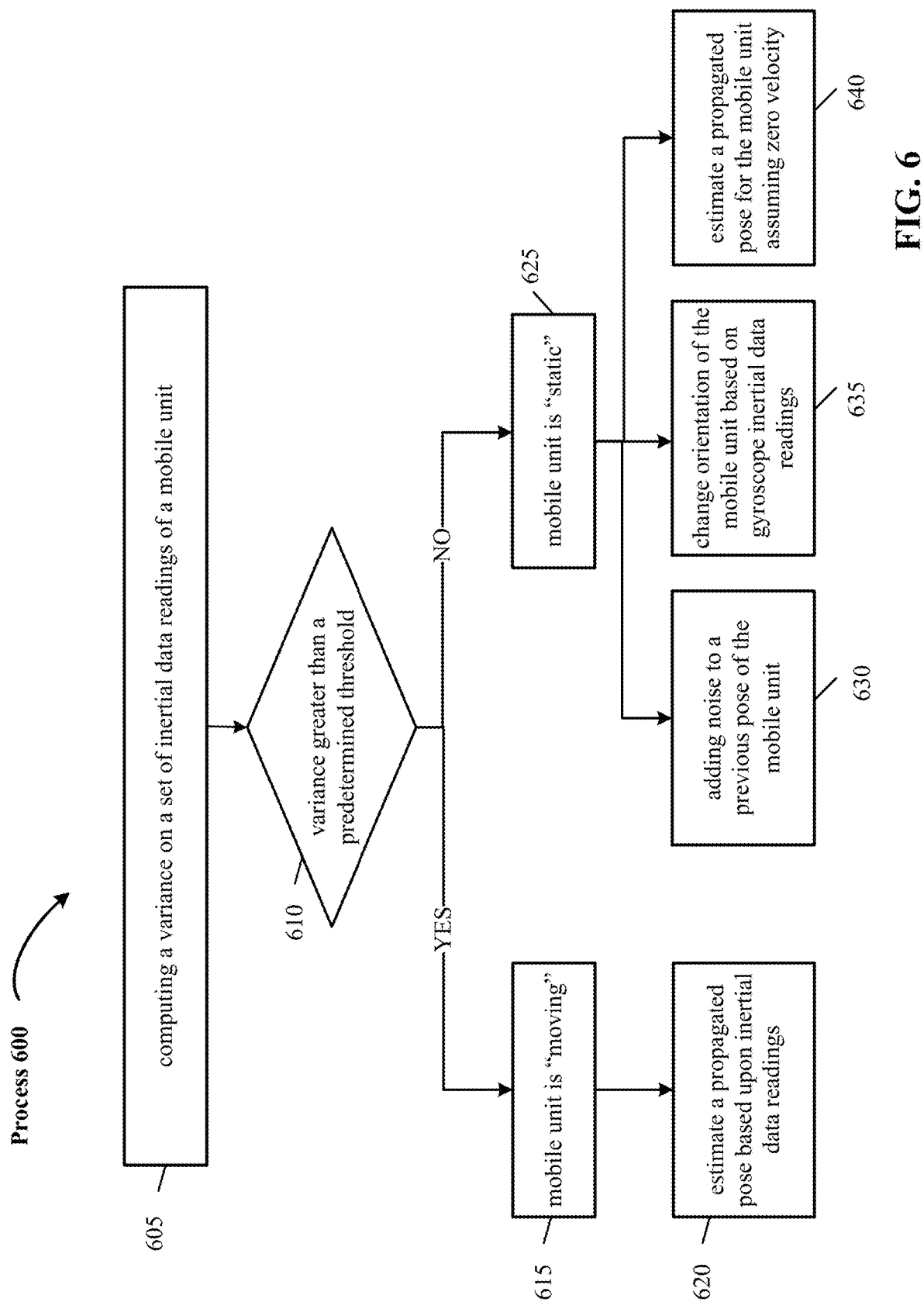
FIG. 6 is a representative method of a motion detection processor in one implementation.

FIG. 6 is a representative method 600 of motion detection processor 414 using information from a multi-axis inertial measuring unit (IMU). Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 6 includes process 600 that begins at action 605, where the motion detection processor computes a variance for the set of accelerometer data readings from a window of time-dependent accelerometer readings from the IMU.

At action 610, if the variance is greater than a threshold, the mobile unit is said to be "moving" (action 615). At action 610, if the variance is smaller than a threshold, the mobile unit is said to be "static" (action 625).

If the motion detection processor determines that the mobile unit is "moving" (action 615), a propagated pose of the mobile unit can be estimated from the inertial data readings from the IMU (action 620).

If the motion detection processor determines that the mobile unit is "static" (action 625), a propagated pose of the mobile unit can be estimated from can be estimated by assuming zero velocity (action 640), adding a white noise to the previous pose of the mobile unit (action 630), or updating the heading orientation of the mobile unit based on the gyroscope readings from the IMU (action 635).

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Sensor Visual Data Generation and Processing

Image Undistortion:

The image undistortion processor 204 corrects distortion in the image data in the captured frames. The image distortion is generally referred to an optical aberration that deforms and bends physically straight lines and makes them appear curvy in images. Optical distortion occurs as a result of optical design. In order to achieve reliable computer vision results, image undistortion processor 204 can undistort the image before further processing is performed. This can be achieved by using a lookup table of the size of the input image, and performing a remapping operation to undistort the whole image.

Feature Undistortion:

In cases when the remaining portions of the processing pipeline do not require the whole image, but only the feature points within the image, the feature undistortion processor 208 perform a feature undistortion operation on the CU. In detail, this operation runs after the feature extraction stage, and undistorts each feature point.

Feature Detection:

The Shi-Tomasi processor 206 performs feature detection upon image frames. Features are "interesting" parts of an image. The Shi-Tomasi feature detection includes methods that aim at computing abstractions of image information and making local decisions at every image point whether there is an image feature of a given type at that point or not. The resulting features will be subsets of the image domain, often in the form of isolated points. Some implementations perform the feature detection on the CU 100 to relieve the host from performing such tasks, and to accelerate the feature detection process. Accordingly, in an implementation, processing includes:

Action 1: calculate Eigen value for each pixel and determine (i) whether the feature is of interest; and (ii) for features of interest, a type of feature:
two small Eigen values: feature is not interesting
one small, one big value: feature is likely an edge
two big values: feature is likely a corner
other type of features Action 2: refine
Apply non-maximum suppression
Apply spatial binning
Apply heuristics
Apply other types of refinement Feature Description:

The feature description engine 210 performs feature description on detected features. The feature description includes methods to uniquely identify each detected points in an image. Feature description can be used to compare and match feature points between different images. Some implementations perform the feature description on the CU 100 to relieve the host from performing such tasks, and to accelerate the feature description process.

One implementation of feature description engine 210 uses a SIMD-accelerated ORB descriptor to describe features. The description of a feature can be used for matching purposes and describing a feature's uniqueness. The ORB descriptor approach was selected for its relative rotational invariance and immunity to Gaussian image noise. One example of an ORB feature detector and binary descriptor can be found at "ORB feature detector and binary descriptor", scikit-image.org/docs/dev/auto_examples/plot_orb.html (last accessed Aug. 17, 2016). For further information on ORB Descriptor, reference may be had to Ethan Rublee, et al., "ORB: an efficient alternative to SIFT or SURF", which is incorporated herein by reference for all purposes.

2D Feature Correspondence Generation:

The optical flow feature correspondence processor 212 performs 2D feature correspondence generation for the features.

Once feature correspondence is identified for any two 2D feature points, triangulation can be applied to the feature points to derive the depth of the point in space. This depth information is employed by processes later in the localization pipeline. Some implementations perform the feature correspondence generation on the CU 100 to relieve the host from performing such tasks, and to accelerate the feature correspondence generation.

One optical flow feature correspondence processor 212 implementation employs optical flow methods to match and link 2D features between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes:

Input: last image, current image, a list of detected feature locations from the last image,
Output: a list of locations of the last image's detected features' in the current image
Assumption: brightness consistency, image changes by and only by motion
Action 1: predict the output locations by either just assuming there is no motion so the current locations are the same as last frame's feature locations, OR use inertial information retrieved from an IMU to predict the locations.
Action 2: refine the pixel coordinate for each feature point by searching around the predicted location, matching patches, and using matching score to determine the refined position. Accordingly, the technology disclosed can provide implementations with the ability to gain increased performance by using inertial information from the IMU to narrow the search and save time.

Another implementation of feature correspondence processor 212 employs spatial-temporal methods to match and link 2D features between more than one image frames, captured from different camera at different time stamps. A set of 2D features can be matched and included in a link if they can be observed from different viewpoints, i.e. different timestamps and/or different cameras.

Accordingly, in an implementation, processing includes:
Input: images captured by different cameras and at different time steps, a list of detected feature locations from the images,
Assumption: brightness consistency, image changes by and only by motion
Action 1, Temporal linking: Match and link 2D features detected from images captured from the same camera and with consecutive time stamps. The matching 2D features are located close to each other between images (i.e. location within ~20 pixels) and have similar feature descriptors.
Action 2, Spatial linking to existing links: For each camera, (i) Collect a set of features that have not been matched to any existing links (i.e. features that are left out from "Temporal matching" from Action 1); (ii) Also collect a set of links that are available to be connected to 2D features from the selected camera. A link is available when it does not currently contain a 2D feature from the selected camera; (iii) Calculate the similarity between each 2D feature and each available link. The similarity between a feature and a link is the best similarity score between the descriptor of the feature and the descriptors of the features in the link. If the similarity score is less than a threshold, it is not possible to add the feature to the link; (iv) Sort the candidate matches between the 2D features and the links according to their similarity score; (v) Match the 2D feature to the link following the sorted similarity score. Once a 2D feature or a link is matched, any candidate matches with that particular 2D feature or that particular link are removed from the set of features that have not been matched and the set of links that are available to be connected; and (vi) Repeat (v) until no new matches are established.

Action 3, Create new links: For each camera, (i) Collect the set of 2D features that have not been matched to any existing links (i.e. features that are left out from both "Temporal linking" from Action 1 and "Spatial linking to existing links" from Action 2); (ii) Calculate the similarity between a pair of 2D features. If the similarity is less than a threshold, it is not possible to match the pair of 2D features; (iii) Sort the candidate matches according to their similarity; (iv) Create a link from each match following the sorter similarity order. Once a 2D feature point is matched, any candidate matches with that 2D feature is removed from the set of features that have not been matched and the set of links that are available to be connected.

In one implementation, the similarity of the descriptors between two 2D features may be recorded in a look-up table in memory for efficiency. In one implementation, to reduce outliers from spatial matching, two 2D features are allowed to be matched when their locations is within X pixels (~20 pixel) in vertical direction if the cameras are aligned horizontally. In another implementation, to reduce outliers from spatial matching, two 2D features are allowed to be matched when their locations is within Y pixels (~20 pixel) in horizontal direction if the cameras are aligned vertically.

IMU-Camera Coordinate Transformation:

In some implementations, the IMU 502 and the cameras 508, 510 do not reside at the same physical location; there is a distance between the IMU 502 and the cameras 508, 510. Accordingly, in order to enable later processes in the localization pipeline to treat the IMU 502 and the cameras 508, 510 as being co-located, on implementation determines a transformation matrix between the IMU 502 and the cameras 508, 510, which can be achieved from an offline production or post-production calibration stage. In CU 100, this transformation matrix is stored locally, and applied to the IMU data. This technique enables later processes to be able to treat the IMU 502 and the cameras 508, 510 to be co-located.

Figure 7:
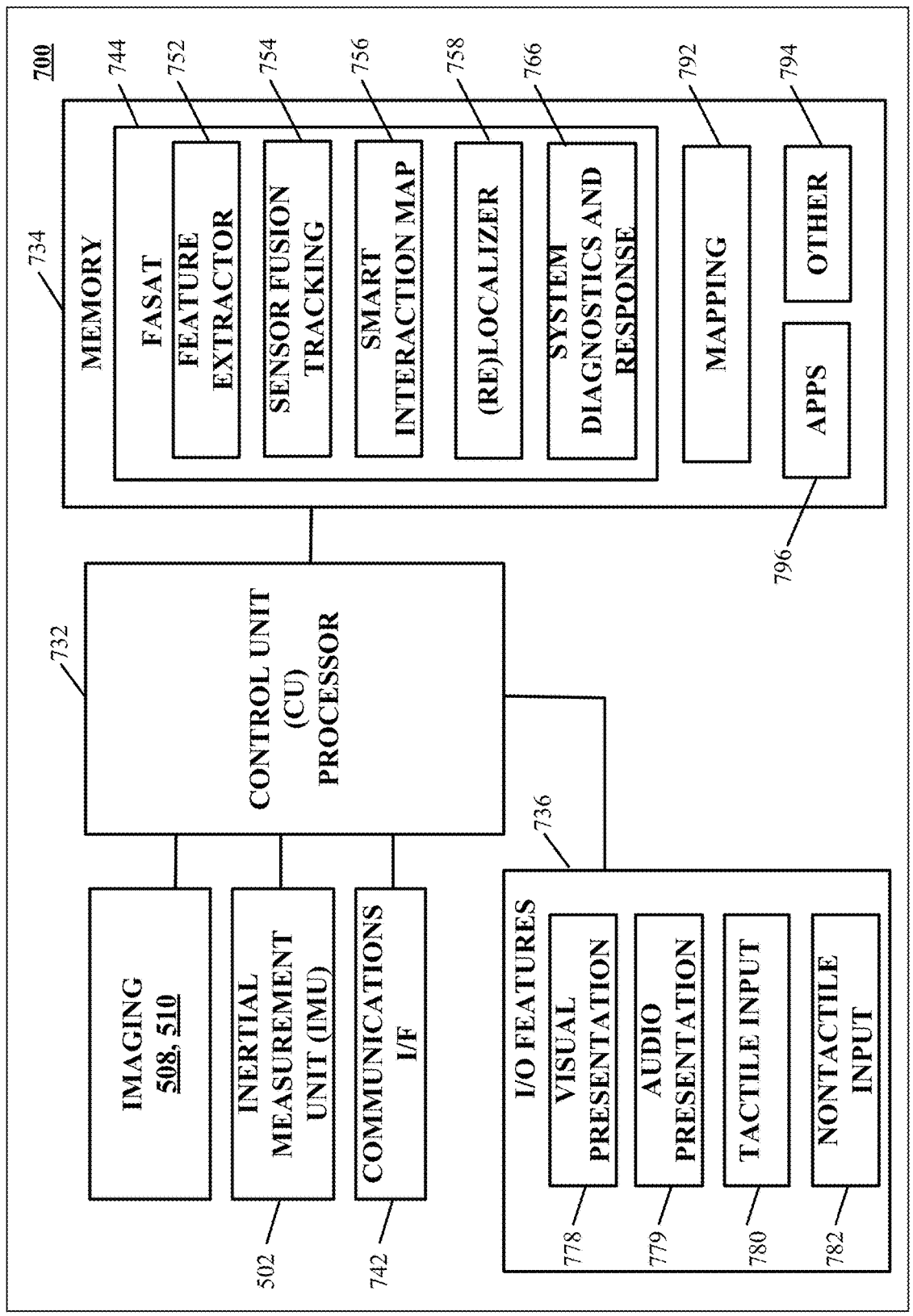
FIG. 7 illustrates an example of a visual-inertial sensory system.

Referring now to FIG. 7, which shows a simplified block diagram of a visual-inertial positioning system 700 implementing visual-inertial sensor 500. Visual inertial positioning system 700 includes a processor 732, a memory 734, an inertial measurement unit IMU 502 and one or more cameras 508 and 510, and a communications interface 742. One or more additional I/O features 736 are included to address implementation specific needs, such as a visual presentation interface 778, an audio presentation interface 779, sensor(s) for detecting tactile input (e.g., keyboards, keypads, touchpads, mouse, trackball, joystick and the like) 780 and non-tactile input (e.g., microphone(s), sonar sensors and the like) 782. Memory 734 can be used to store instructions to be executed by processor 732 as well as input and/or output data associated with execution of the instructions. In particular, memory 734 contains instructions, conceptually illustrated as a group of modules described in greater detail below, that control the operation of processor 732 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENACTION operating system, iOS, Android or other mobile operating systems, or another operating system of platform.

The computing environment may also include other removable/non-removable, volatile/nonvolatile computer storage media. For example, a hard disk drive may read or write to non-removable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

In an embodiment, the processor 732 is a NEON ARM processor implementing a single input-multiple data (SIMD) architecture as a reduced instruction set computer (RISC) architecture. Depending on implementation, however, processor 732 can alternatively be a realized using a specific purpose microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that are capable of implementing the actions of the processes of the technology disclosed.

Communications interface 742 can include hardware and/or software that enables communication between visual inertial positioning system 700 and other systems controlling or enabling customer hardware and applications (hereinafter, a "host system" or "host") such as for example, a robot or other guided mobile platform, an autonomous vehicle, a virtual reality-augmented reality wearable device (VR/AR headset) or the like (not shown in FIG. 7 for clarity sake). Cameras 508, 510, as well as sensors such as IMU 502 can be coupled to processor 732 via a variety of communications interfaces and protocols implemented by hardware and software combinations. Thus, for example, positioning system 700 can include one or more camera data ports and/or motion detector ports (not shown in FIG. 7 for clarity sake) to which the cameras and motion detectors can be connected (via conventional plugs and jacks), as well as hardware and/or software signal processors to modify data signals received from the cameras and motion detectors (e.g., to reduce noise or reformat data) prior to providing the signals as inputs to a fast accurate stable adaptive tracking ("FASAT") process 744 executing on processor 732. In some implementations, visual-inertial positioning system 700 can also transmit signals to the cameras and sensors, e.g., to activate or deactivate them, to control camera settings (frame rate, image quality, sensitivity, etc.), to control sensor settings (calibration, sensitivity levels, etc.), or the like. Such signals can be transmitted, e.g., in response to control signals from processor 732, which may in turn be generated in response to user input or other detected events.

Instructions defining FASAT process 744 are stored in memory 734, and these instructions, when executed, perform analysis on image frames captured by the cameras 508, 510 and inertial data captured by the IMU 502 connected to visual inertial positioning system 700. In one implementation, FASAT process 744 includes various logical processes, such as a feature extractor 752 that receives a raw image and determines a salient points' representation of objects in the image thereby representing the geometry understanding of the objects from a machine's perspective view. In some implementations, feature extractor 752 analyzes images (e.g., image frames captured via cameras 508, 510) to detect edges of an object therein and/or other information about the object's location. A sensor fusion tracking process 754 uses feature extraction results and inertial data from IMU 502 to generate pose accurately and rapidly. A smart interaction map 756 enables using a known map of obstructions to localize the sensor 500. The map is built using mapping functionality of mapping process 792, which is described in further detail herein below. A Re-localizer process 758 recovers device positional awareness when the device has lost track of device position. A system diagnostic and response (SDAR) 766 manages of current localizing state of the device and provide response strategy.

A mapping process 792 generates a hybrid occupancy grid that maps the space and objects recognized by the feature extractor 752. The hybrid occupancy grid includes (i) a point cloud representation of points in space located in the image frames and (ii) one or more x-y plane occupancy grids arranged at heights to intersect points on the extracted features.

In some implementations, other processing 794 analyzes audio or ultrasonic signals (e.g., audio signals captured via sonar or audio sensors comprising non-tactile input 782) to localize objects and obstructions by, for example, time distance of arrival, multilateration or the like. ("multilateration is a navigation technique based on the measurement of the difference in distance to two or more stations at known locations that broadcast signals at known times. See Wikipedia, at <en.wikipedia.org/w/index.php?title=Multilateration&oldid=523281858>, on Nov. 16, 2012, 06:07 UTC). Audio signals place the object on a known surface, and the strength and variation of the signals can be used to detect object's presence. If both audio and image information is simultaneously available, both types of information can be analyzed and reconciled to produce a more detailed and/or accurate path analysis.

In some implementations, other processing 794 determines paths to track and predict device movements in space based upon the hybrid occupancy grid generated by mapping process 792. Some implementations 794 includes an augmented reality (AR)/virtual reality (VR) environment that provides integration of virtual objects reflecting real objects (e.g., virtual presence of friend 1715 in FIG. 17) as well as synthesized objects 1815 in FIG. 18 for presentation to user of device 1725 in FIG. 17 via presentation interface 778 to provide a personal virtual experience. One or more applications 796 can be loaded into memory 734 (or otherwise made available to processor 732) to augment or customize functioning of device 500 thereby enabling the system 700 to function as a platform. Successive camera images are analyzed at the pixel level to extract object movements and velocities. In some implementations, presentation interface 778 includes a video feed integrator provides integration of live video feed from the cameras 508, 510 and one or more virtual objects. Video feed integrator governs processing of video information from disparate types of cameras 508, 510. For example, information received from pixels that provide monochromatic imaging and from pixels that provide color imaging (e.g., RGB) can be separated by integrator and processed differently. Image information from visual sensors can be used mainly for agent localization that extracts features from images and provide a plurality of functions: firstly, to extract features from images in agent localization (similar to the usage of grayscale camera), and secondly, to provide raw information for deep learning based tasks, including object recognition, object tracking, image captioning, and the like. Information from one type of sensor can be used to enhance, correct, and/or corroborate information from another type of sensor. Information from one type of sensor can be favored in some types of situational or environmental conditions (e.g., low light, fog, bright light, and so forth). The device can select between providing presentation output based upon one or the other types of image information, either automatically or by receiving a selection from the user. An imaging integrator can be used in conjunction with AR/VR environment control the creation of the environment presented to the user via presentation interface 778.

Presentation interface 778, audio presentation 779, non-tactile input 782, and communications interface 742 can be used to facilitate user interaction via device 500 with Visual inertial positioning system 700. These components can be of highly customized design, generally conventional design or combinations thereof as desired to provide any type of user interaction. In some implementations, results of analyzing captured images using inertial measuring unit 502 and cameras 508, 510 and FASAT program 752 can be interpreted as representing objects and obstacles in 3D space. For example, a robot equipped with visual-inertial sensor 500 can perform path planning and/or obstacle avoidance across a surface that has been analyzed using FASAT program 752, and the results of this analysis can be interpreted as an occupancy map by some other program executing on processor 732 (e.g., a motion planner, localization and tracking process, or other application). Thus, by way of illustration, a robot might use sweeping of cameras 508, 510 across a room in order to "map" a space currently imaged to a hybrid point grid that can be used by a host device such as a monitor, VR headset or the like via presentation interface 778, to provide visual input of the area that the robot is "seeing". Smart interaction map 756 may use the representation of space built by mapping 792 to plan a path for a robot or mobile platform through the space, e.g., to improve localization and tracking of the robot or platform through the space.

It will be appreciated that Visual-inertial positioning system 700 is illustrative and that variations and modifications are possible. Visual inertial positioning systems can be implemented in a variety of form factors, including "cloud" computing systems of servers and networks, desktop systems, laptop systems, tablets, smart phones or personal digital assistants, and so on. A particular implementation may include other functionality not described herein for clarity sake. In some implementations, one or more cameras and two or more microphones may be built into the visual-inertial system 700 or may be supplied as separate components. Further, an image or audio analyzer can be implemented using only a subset of Visual inertial positioning system 700 components (e.g., as a processor executing program code, an ASIC, or a fixed-function digital signal processor, with suitable I/O interfaces to receive image data and output analysis results).

While Visual inertial positioning system 700 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired. Thus, for example, execution of feature extractor 752 by processor 732 can cause processor 732 to operate inertial measurement unit 502 and cameras 508, 510 to capture images and/or audio signals of an object traveling across and in contact with a surface to detect its entrance by analyzing the image and/or audio data.

Tracking

Tracking refers to capabilities rendered by system hardware and functional processes that enable a controlled device (robot, mobile platform, or VR/AR headset, goggles, or other hardware) to continuously localize itself and have positional awareness e.g., the sensor system can determine where it is in the real world.

Architecture for Tracking System

Figure 8:
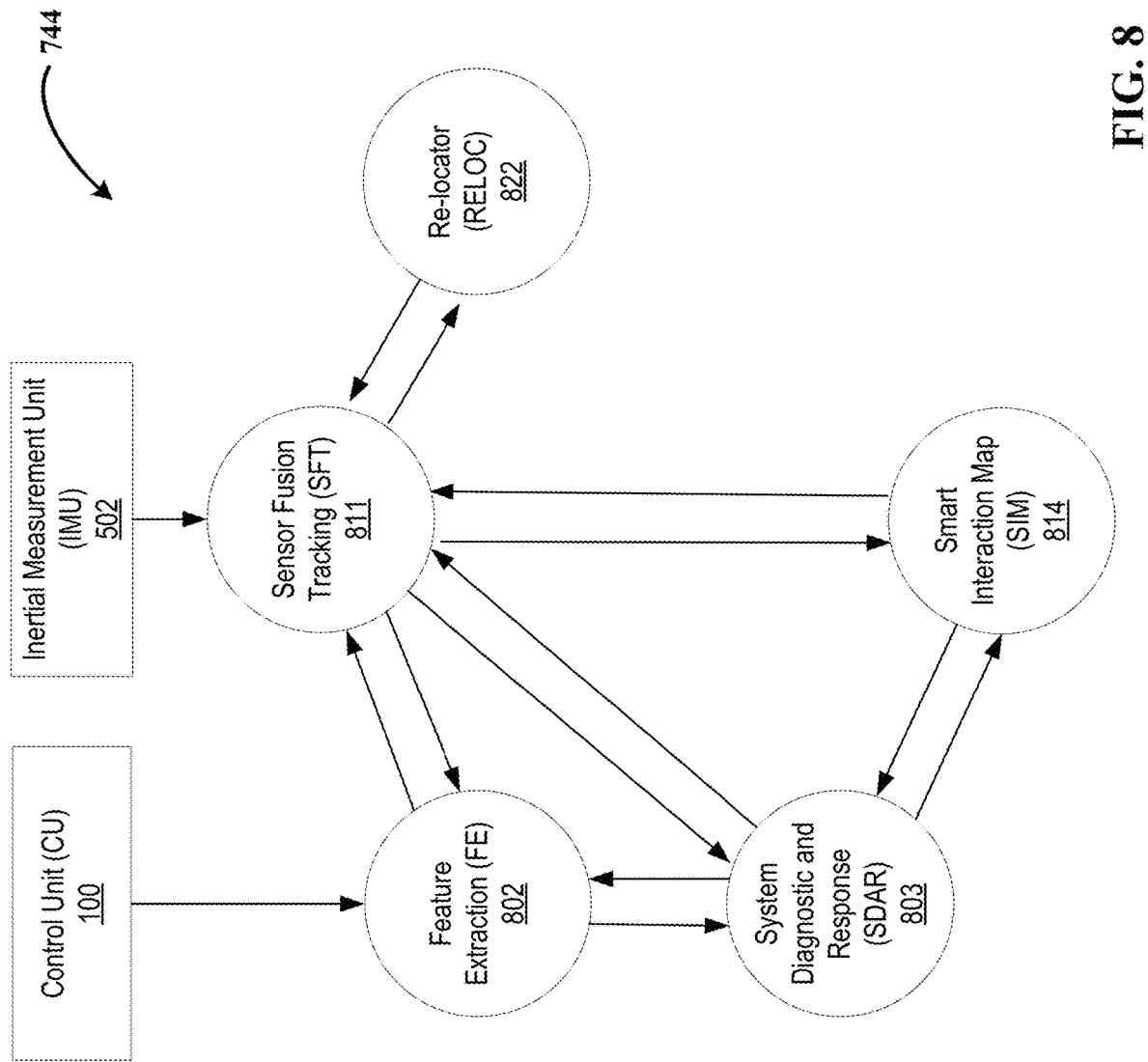
FIG. 8 illustrates an example tracking system implementing the tracking process.

FIG. 8 illustrates example architecture for a tracking system implementation. As shown in FIG. 8, components and information flows between components of an example fast accurate stable adaptive tracking ("FASAT") process 744 of FIG. 7 are illustrated by feature extractor (FE) 802, sensor fusion based tracker (SFT) 811, smart interaction with map (SIM) processor 814, a system diagnostics and response (SDAR) processor 803 and a Re-locator (RELOC) 822. The data flows and operation of one example implementation of these components will next be described.

Feature Extraction

A feature extractor (FE) 802 represents the geometric understanding of a space from a machine's perspective view. Feature extractor 802 receives raw image information from control unit 100 and provides a salient points' representation hybrid point cloud map to a sensor fusion tracker (SFT) 811. One implementation of a feature extractor 802 performs a variety of actions including image preprocessing, feature detection, and feature descriptor preparation.

Image processing tasks include performing Gaussian blur and gamma correction on raw image data.

Feature Detection: Optical Flow

Optical flow gives 2D-2D correspondence between previous image and a current image. Feature extractor 802 generates a hierarchy of levels; each level generation is aligned with optical flow needs, and therefore need only be computed once.

Processed images are stored in a multiple hierarchical patch and/or undistorted patch. In an example implementation, as levels in the hierarchy increase, the more blur exists in the image. At each level in the hierarchy, the size of the image is reduced to ¼ of the size of the image from which it is derived, e.g. the size of the image in the previous level. For example, if an image on the first ("zero level") has a size 640×480, then the size of the corresponding image on the next higher level ("first level") has a size 320×240, and an next corresponding image at the next higher level ("second level") has a size 160×120. If the same feature point appears at more than one level, then that feature point is determined by the system to be a strong feature point. In the foregoing example, a scale factor of 2 is used, however, any scale factor can be selected, e.g., a scale factor of 1.6 provides the original 640×480 image with a next level image having a resolution of 400×300.

One feature extractor 802 implementation employs optical flow methods to match and link 2D features between two image frames, taken at times t and t+Δt at each voxel position. One such method, called a differential method, is based on local Taylor series approximations of the image signal, using partial derivatives with respect to the spatial and temporal coordinates. Accordingly, in an implementation, processing includes:

Input: last image, current image, a list of detected feature locations from the last image, Output: a list of locations of the last image's detected features' in the current image Assumption: brightness consistency, image changes by and only by motion Action 1: predict the output locations by either just assuming there is no motion so the current locations are the same as last frame's feature locations, OR use inertial information retrieved from an IMU to predict the locations.

Action 2: refine the pixel coordinate for each feature point by searching around the predicted location, matching patches, and using matching score to determine the refined position. Accordingly, the technology disclosed can provide implementations with the ability to gain increased performance by using inertial information from the IMU to narrow the search and save time.

Another implementation of feature correspondence processor 802 employs spatial-temporal methods to match and link 2D features between more than one image frames, captured from different camera at different time stamps. Accordingly, in an implementation, processing includes:

Input: images captured by different cameras and at different time steps, a list of detected feature locations from the images, Assumption: brightness consistency, image changes by and only by motion Action 1, Temporal linking: Match and link 2D features detected from images captured from the same camera and with consecutive time stamps. The matching 2D features are located close to each other between images (i.e. location within ~20 pixels) and have similar feature descriptors.

Action 2, Spatial linking to existing links: For each camera, (i) Collect a set of features that have not been matched to any existing links (i.e. features that are left out from "Temporal matching" from Action 1); (ii) Also collect a set of links that are available to be connected to 2D features from the selected camera. A link is available when it does not currently contain a 2D feature from the selected camera; (iii) Calculate the similarity between each 2D feature and each available link. The similarity between a feature and a link is the best similarity score between the descriptor of the feature and the descriptors of the features in the link. If the similarity score is less than a threshold, it is not possible to add the feature to the link; (iv) Sort the candidate matches between the 2D features and the links according to their similarity score; (v) Match the 2D feature to the link following the sorted similarity score. Once a 2D feature or a link is matched, any candidate matches with that particular 2D feature or that particular link are removed from the set of features that have not been matched and the set of links that are available to be connected; and (vi) Repeat (v) until no new matches are established.

Action 3, Create new links: For each camera, (i) Collect the set of 2D features that have not been matched to any existing links (i.e. features that are left out from both "Temporal linking" from Action 1 and "Spatial linking to existing links" from Action 2.); (ii) Calculate the similarity between a pair of 2D features. If the similarity is less than a threshold, it is not possible to match the pair of 2D features; (iii) Sort the candidate matches according to their similarity; (iv) Create a link from each match following the sorter similarity order. Once a 2D is matched, any candidate matches with that 2D feature is removed from the set of features that have not been matched and the set of links that are available to be connected.

In one implementation, the similarity of the descriptors between two 2D features may be recorded in a look-up table in memory for efficiency. In one implementation, to reduce outliers from spatial matching, two 2D features are allowed to be matched when their locations is within X pixels (~20 pixel) in vertical direction if the cameras are aligned horizontally. In another implementation, to reduce outliers from spatial matching, two 2D features are allowed to be matched when their locations is within Y pixels (~20 pixel) in horizontal direction if the cameras are aligned vertically.

Feature Detection: Shi-Tomasi

One implementation of feature extraction processor 802 uses NEON-accelerated Shi-Tomasi feature detection with spatial binning in order to obtain features from regions to cover as much as possible for the full image. The feature extractor 802 uses IMU and the pose information received from sensor fusion tracker 811 in order to dynamically decide the regions to track and the parameters to use. Features are "interesting" parts of an image. Accordingly, in an implementation, processing includes:

Action 1: calculate Eigen value of the intensity value of each pixel and its surrounding pixels; and determine (i) whether the feature is of interest; and (ii) for features of interest, a type of feature
  two small Eigen values: feature is not interesting
  one small, one big value: feature is likely an edge
  two big values: feature is likely a corner
  other type of features Action 2: refine
  Apply non-maximum suppression
  Apply spatial binning
  Apply heuristics
  Apply other types of refinement Feature Descriptor: ORB Descriptor One implementation of feature extractor 802 uses a SIMD-accelerated ORB descriptor to describe features. The description of a feature can be used for matching purposes and describing a feature's uniqueness. The ORB descriptor approach was selected for its relative rotational invariance and immunity to Gaussian image noise. One example of an ORB feature detector and binary descriptor can be found at "ORB feature detector and binary descriptor", scikit-image.org/docs/dev/auto_examples/plot_orb.html (last accessed Aug. 17, 2016). For further information on ORB Descriptor, reference may be had to Ethan Rublee, et al., "ORB: an efficient alternative to SIFT or SURF", which is incorporated herein by reference for all purposes.

Bag-of-Words

One implementation of feature extractor 802 performs bag-of-words extraction, determining from one image a byte array, sparse histogram over vocabulary. Accordingly, in an implementation, Bag-of-words processing includes using a list of feature descriptors in one image to extract Bag-of-words feature for one image. For example, in an image having 400 features with 400 corresponding descriptors, and a bag-of-word feature with the size of 256 bits. The resulting Bag-of-words is a 256 bit array, and one image only needs/has one 256 bit array. Bag-of-words is useful in performing relocalization as described herein below in further detail. Bag-of-words can indicate among A, B, C images, an image D has a matching score individually D-A, D-B, D-C. Say for example that D-B has the highest score, then the camera taking image D is closest to the camera pose used when taking image B, not A or C.

One implementation of feature extractor 802 adaptively adjusts a threshold that is applied to a number of features needed in order for the system to keep track of a moving object. Such intelligent thresholds include a threshold that is adaptively adjusted based upon device movement, sensor readings, situational or environmental variables (e.g., low light, fog, bright light, and so forth) or combinations thereof. Once sufficient number of features (e.g., above the threshold) are identified, the system will continue to track an object. Otherwise, the system does not track the object. Feature extractor 802 will adaptively adjust the threshold based on device movement and other sensor levels.

SFT: Generating Pose Information from Feature Extraction Results and Inertial Data Sensor fusion based tracker (SFT) 811 determines how to smartly use feature extraction results and inertial data from IMU 502 to generate pose accurately and rapidly. Sensor fusion based tracker 811 performs initialization for the system state, feature extractor initial state, interaction with map state, and other states. Sensor fusion based tracker 811 has logic to decide how to initialize the state including use how many first sample IMUs, how many images to skip, and any other initialization steps for specific hardware.

In an implementation, sensor fusion based tracker 811 performs IMU buffer management. Timestamps of IMU data frames are corrected and aligned. Additionally, IMU information that has not been processed yet is maintained in a buffer.

Generating Pose Information for a Visual-Inertial Sensor with Successful Visual Updates:

Propagation: Implementations can employ extended Kalman filtering (EKF), shown in a general nonlinear model form by equations (1), to extrapolate an initial pose using inertial data from the multi-axis IMU, to generate a propagated pose:

$$\dot{x}=f(x)+w$$

$$z=h(x)+n \quad (1)$$

where x denotes a state vector, f denotes a nonlinear function, h denotes observation nonlinear function, n denotes measurement noise, z denotes an observation vector, and w denotes a noise vector.

A linearized version of the discrete-time model of equation (1) is useful for covariance propagation and update, as well as gain computation is illustrated by equations (2):

$$\tilde{X}_{I+1} \approx \varphi_I \tilde{X}_I + w_I$$

$$\tilde{r} \approx H_I \tilde{X}_I + n_I \quad (2)$$

In an implementation, IMU data alone is used to perform propagation of the EKF. This enables certain implementations to provide fast results and at relatively low computation costs. An update process described below is employed to correct for "drifting" that occurs when only inertial information is used in the EKF to determine pose. Propagation can be performed in a number of ways: (i) the propagation happens right after an inertial measurement taken by the IMU arrives; or (ii) delayed propagation happens in batch right after an image taken by the visual sensors arrives but before the update procedure described below is performed. Of course, wheel odometry and/or user-defined control can also be used to perform propagation. In one implementation, a "plug-and-play" decision engine will decide if, when, and how to do multiple types of propagation.

Update: In an implementation, an update process is performed using image information together with IMU buffer samples, which can correct the pose which may be drifted from propagation. In a single observation implementation, based on the current image observation, the information needed for propagation, e.g., features, poses, map points, etc. is prepared. Then 2D-3D correspondence information for the optical flow tracked 2D features is obtained by directly using 2D-2D correspondences from optical flow tracking results. For the remaining 3D map points, smartly search over 3D with adaptive parameters by: (i) if the remaining number of points is small, e.g., below a threshold, perform a linear search, otherwise, (ii) if the remaining number of points is fairly big, e.g., above a threshold, perform a log(n) search with the use of a kd-tree or octree. During search, use previous time period velocity/acceleration to predict a pose so as to narrow the search region. Next, perform update, and generate pose for the current frame using only "good outstanding" points. Alternatively, perform the update twice: first only with high weights "good outstanding" points, then with all the map points. As used herein, the term "good outstanding" points denotes high quality points, e.g., those points having smaller reprojection error and/or being tracked many times in a good state, which can be selected by application of some heuristics.

In a multiple observation implementation, based on multiple previous image observation, information from multiple poses is used in the extended Kalman filter described herein with reference to equations (1) and (2). Every feature's whole life is used in the extended Kalman filter.

Figure 9:
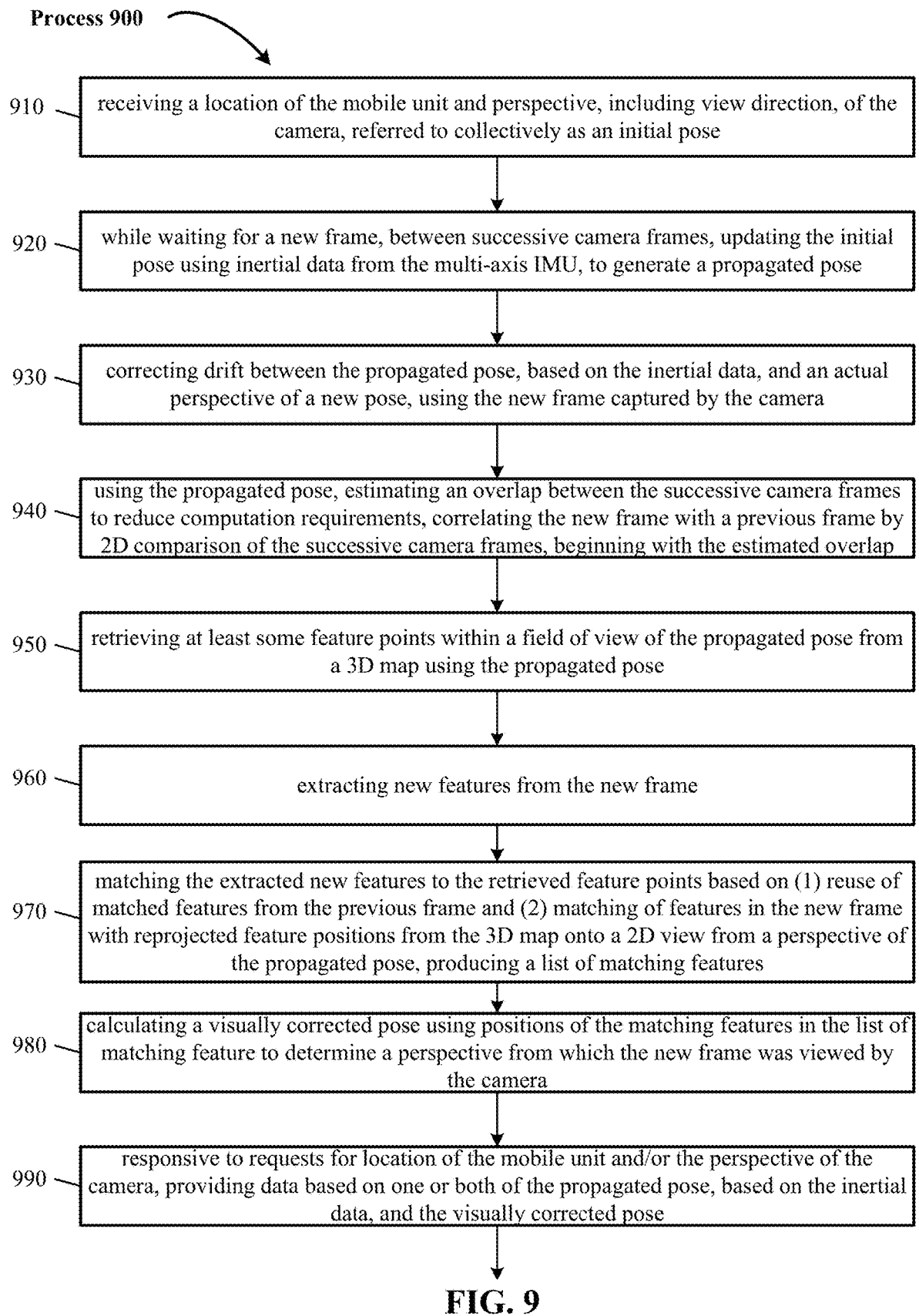
FIG. 9 is a representative method of updating a position of a mobile unit that includes cameras with distance calculation and multi-axis inertial measuring unit (IMU).

FIG. 9 is a representative method 900 of updating a position of a mobile unit that includes a camera with distance calculation and multi-axis inertial measuring unit (IMU). Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 9 includes process 900 that begins at action 910, where a location of the mobile unit and perspective, including orientation, of the camera, referred to collectively as an initial pose is received. In some implementations, initial pose representations include coordinate e.g., points (x, y, z) mapped to a coordinate system of a visual-inertial sensor disposed on a mobile platform, such as a robot, autonomous vehicle, or other autonomous or guided mobile platform.

Process 900 continues at action 920 where while waiting for a new frame, between successive camera frames, the initial pose is updated using inertial data from the multi-axis IMU, to generate a propagated pose.

At action 930, drift between the propagated pose, based on the inertial data, and an actual perspective of a new pose, is corrected using the new frame captured by the camera. This action can include a number of actions as well:

At action 940, using the propagated pose, an overlap between the successive camera frames is estimated to reduce computation requirements, and the new frame is correlated with a previous frame by 2D comparison of the successive camera frames, beginning with the estimated overlap.

At action 950, at least some feature points within a field of view of the propagated pose are retrieved from a 3D map using the propagated pose.

At action 960, new features are extracted from the new frame.

At action 970, the extracted new features are matched to the retrieved feature points based on (1) reuse of matched features from the previous frame and (2) matching of features in the new frame with reprojected feature positions from the 3D map onto a 2D view from a perspective of the propagated pose, producing a list of matching features.

At action 980, a visually corrected pose is calculated using positions of the matching features in the list of matching feature to determine a perspective from which the new frame was viewed by the camera.

At action 990, responsive to requests for location of the mobile unit and/or the perspective of the camera, data based on one or both of the propagated pose, based on the inertial data, and the visually corrected pose is provided.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Generating Pose Information for a Visual-Inertial Sensor from Past Sensory Data:

In some instances, the mobile unit under guidance can have unsuccessful image updates due to hardware or software malfunctions of the cameras, blurred image due to sudden movement of the machine, obstruction of view, low illumination of the surrounding environment, etc. The mobile unit can also traverse in an unknown territory without any global map. In some implementations, the machine under guidance can also estimate its current pose by keeping a window of past readings of visual data, inertial data and tracking poses.

Figure 10:
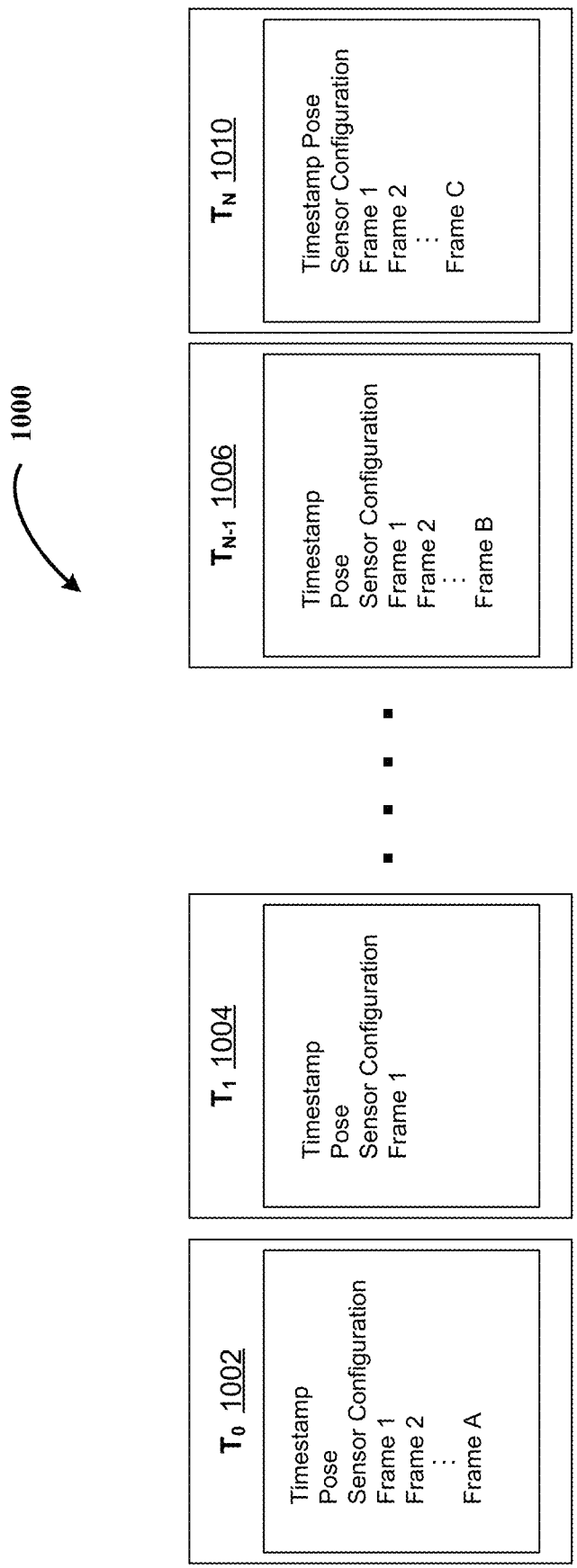
FIG. 10 illustrates an example set of time dependent tracking states.

FIG. 10 is a symbolic drawing of a set of time dependent tracking states 1000. As can be seen in FIG. 10, the set of time dependent tracking states 1000 comprises of N tracking states numbered $T_0$-$T_N$, with N>=1. In one implementation, the set of time dependent tracking states 1000 can be in descending order in time where $T_0$ 1002 is the most current tracking state of the visual-inertial sensor 500, and $T_1$ 1004 to $T_N$ 1010 represent past tracking states. In another implementation, the set of time dependent tracking states 1000 can be in ascending order in time where $T_N$ 1010 is the most current tracking state of the visual-inertial sensor 500, and $T_0$ 1002 to $T_{N-1}$ 1006 represent past tracking states. Each tracking state consists of (i) the timestamp at which the tracking states was captured; (ii) pose of the mobile unit at that timestamp, e.g. location, orientation, and velocity of the mobile unit; (iii) sensor configuration of the visual-inertial sensor 500, e.g. intrinsic parameters of the sensors (IMU bias, camera focal length, etc.) and extrinsic parameters (relative poses between the different sensors in the visual-inertial sensor 500); and (iv) one or more frames of sensor readings from the visual sensors (cameras) and the inertial sensor (multi-axis IMU). Frames storing data from the visual sensors include sets of detected 2d feature points.

In one implementation, the number of tracking states in the set of time dependent tracking states 1000 is fixed and depends on the sensors. In one implementation, the number of tracking states in the set of time dependent tracking states 1000 is 30 in order to keep 1 second worth of visual sensor data for a 30 Hz camera. In one implementation, the number of tracking states in the set of time dependent tracking states 1000 is dynamically determined to maintain sensory data for a range of time. In one implementation, the number of tracking states in the set of time dependent tracking states 1000 is dynamically determined to maintain 1 second worth of visual sensor data. In one implementation, the number of tracking states in the set of time dependent tracking states 1000 is dynamically determined to maintain a manageable number of 2D feature points. In one implementation, the number of tracking states in the set of time dependent tracking states 1000 is dynamically determined to maintain less than 200 2D feature points.

Propagation: Implementations can employ extended Kalman filtering (EKF), shown in a general nonlinear model form by equations (3), to extrapolate an initial pose using inertial data from two or more tracking states from the set of time dependent tracking states 1000, to generate a propagated pose:

$$\dot{x} = f(x) + w$$

$$z = h(x) + n \quad (3)$$

where x denotes a state vector, f denotes a nonlinear function, h denotes observation nonlinear function, n denotes measurement noise, z denotes an observation vector, and w denotes a noise vector.

A linearized version of the discrete-time model of equation (3) is useful for covariance propagation and update, as well as gain computation is illustrated by equations (4):

$$\tilde{X}_{l+1} \cong \varphi_l \tilde{X}_l + w_l$$

$$\tilde{r} \cong H_l \tilde{X}_l + n_l \quad (4)$$

In an implementation, IMU data alone is used to perform propagation of the EKF. This enables certain implementations to provide fast results and at relatively low computation costs. An update process described below is employed to correct for "drifting" that occurs when only inertial information is used in the EKF to determine pose. Propagation can be performed in a number of ways: (i) the propagation happens right after an inertial measurement taken by the IMU arrives; (ii) delayed propagation happens in batch right after an image taken by the visual sensors arrives but before the update procedure described below is performed; (iii) a number of IMU updates occurring after a successful image update; (iv) failure in one or more visual sensors; or (v) the motion detector predicts the mobile unit is moving.

Update: In an implementation, an update process is performed using image information from a set of time dependent tracking states 1000 together with inertial data. In a single observation implementation, pose update for one or more selected tracking frame in a set of time dependent tracking states 1000 is done by: (i) creating a 2D feature correspondences set comprising of common 2D feature points among the visual sensor frames from the selected tracking states; (ii) triangulating 2D feature points from the 2D feature correspondences set to form a 3D point set; (iii) selecting a subset of the 3D point set that includes 3D points having re-projection error within a threshold; and (iv) updating current poses for two or more of the tracking states within the set of time dependent tracking states subject based on the selected 3D points with low re-projection error. In one implementation, the above triangulation step further includes selecting 3D points having a triangulation error less than a determined number of pixels. In one implementation, the above triangulation step further includes adjusting the threshold for selecting 3d points based upon a quantity of 3D points available to update poses in the set of time dependent tracking states. In one implementation, the 3D points are further refined to have lower reprojection error using a least squares function.

In a multiple observation implementation, based on multiple previous image observation, information from multiple poses is used in the extended Kalman filter described herein with reference to equations (3) and (4). Every feature's whole life is used in the extended Kalman filter.

Figure 11:
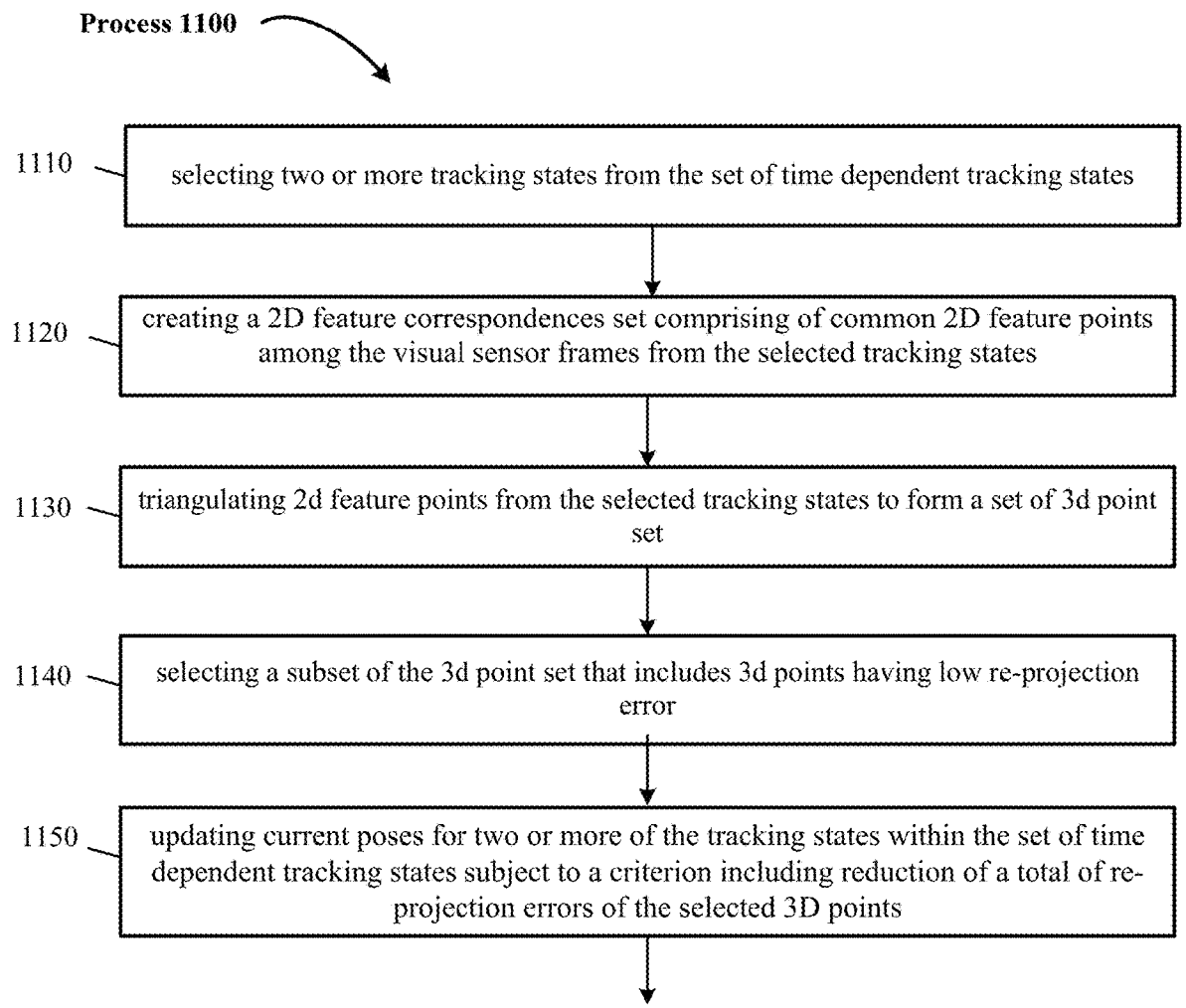
FIG. 11 is a representative method of updating a position of a mobile unit that includes cameras with distance calculation, multi-axis inertial measuring unit (IMU), and a set of time dependent tracking states.

FIG. 11 is a representative method 1100 of updating a position of a mobile unit that includes cameras with distance calculation, multi-axis inertial measuring unit (IMU), and a set of time dependent tracking states. Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 11 includes process 1100 that begins at action 1110, where two or more tracking states are selected from a set of time dependent tracking states for the purpose of updating the pose associated with the selected tracking frame. The location, perspective and orientation referred to collectively as an initial pose of the mobile unit is updated at the selected tracking frame's timestamp.

Process 1100 continues at action 1120 where a 2D feature correspondences set is created, where the 2D feature correspondences set comprises of common 2D feature points among the visual sensor frames from the selected tracking states.

At action 1130, 2D feature points from the 2D feature correspondences set are triangulated to form a 3D point set.

At action 1140, a subset of the 3D point set which have a re-projection error within a threshold is selected from the 3D point set.

At action 1150, current poses for two or more of the tracking states within the set of time dependent tracking states subject are updated based on the selected 3D points with low re-projection error.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

SIM: Smart Map Interaction and Localize

Smart interaction with map (SIM) processor 814 enables smart interaction by a device being guided (i.e., receiving positional awareness information from visual-inertial sensor system 600) with a known map in order to localize itself. Accordingly, one implementation of a smart interaction map processor 814 processing includes:

- Perform a query of the map based on a need and a current status. Some query components included by specific implementations are map points (xyz, uncertainty, average reprojection error, etc.), keyrigs' poses, 2D-3D constraint information, and occupancy grid (one layer or multiple layer). As used herein, the term keyrig denotes a set of image data received. In some implementations, the sets of image data include feature points and pose information. The pose information includes a location of the mobile device and view of the camera that captured the image data. The sets of image data are referred to collectively as keyrigs.
- If the map as a whole is not big, e.g., meets a particular threshold size, return the entire map.
- Otherwise, if the map is big, e.g., meets or exceeds a particular threshold size and covers large areas, e.g., spatial area meets or exceeds a particular threshold, smartly grab a local region of map based on the device's current position.
- If some area of the map is known to have bad quality, don't use it.
- Adaptively down-sample map based on system performance according to an adaptive parameter. For example: (i) if the 3D feature-based tracking process has been accurate, e.g., below a threshold number of errors or invocations of relocalization processing to relocalize a device that has lost its place, then reduce the sample size to conserve resources, otherwise, (ii) if the device is getting lost frequently, e.g., meets or exceeds a threshold, then increase the sample size to provide better tracking.

SDAR: Manage Localization State and Response Strategy

System diagnostics and response (SDAR) processor 803 performs system level management of current localizing state of the visual-inertial sensor 500 and provides response strategy. In one implementation, the system diagnostics and response processor 803 monitors tracked map points and corresponding reprojection error, monitors the longevity of untracked map points, and suggests actions to mapping module, monitors device speed/acceleration/jitter/drift, monitors map "activity" (i.e., is it updated regularly?), performs new added map contribute enough to the overall mapping (i.e., so it's not doing useless hovering?), monitors keyrig topology (i.e., stretch enough or too much?), suggests when and where the device should add keyrig, and monitors feature extractor pipeline Relocalize a Lost Device Re-locator 822 recovers a device that has lost track of its positional from this state. Once re-locator 822 returns the lost device back on track, the device can resume normal interacting with smart interaction map processor 814, and/or can contribute to map building, using the techniques described herein below.

Relocalization

Figure 12A:
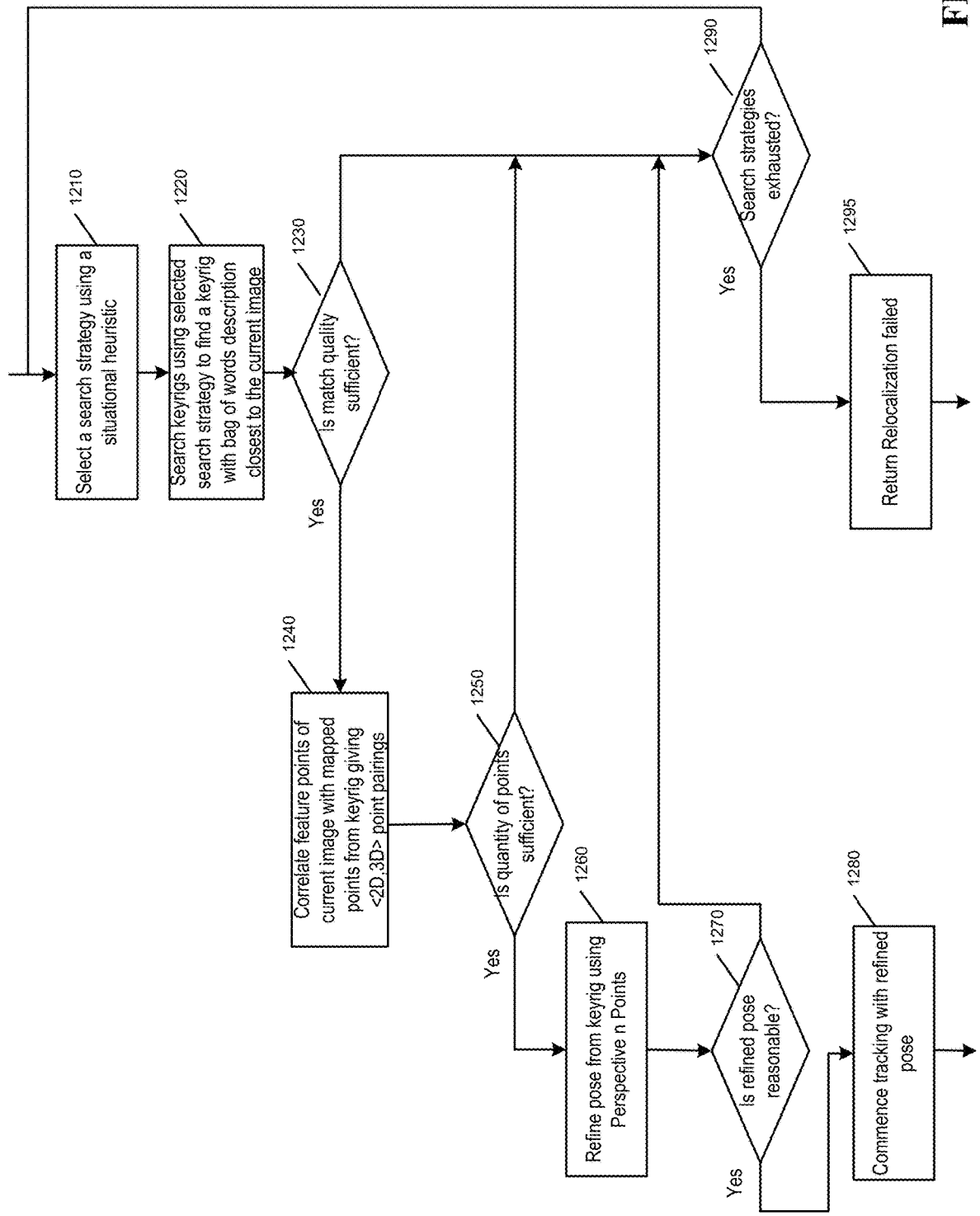
FIG. 12A illustrates an example relocalization process for a tracking system implementing the tracking process.

FIG. 12A illustrates an example of a relocalization process in one implementation. Accordingly, one implementation of relocalization processing 1200A includes:

- In action 1210, a search strategy is selected using a situational heuristic. For example, if there are many keyrigs, (e.g., >50) and a fast recovery is needed, then select a search strategy of performing a best match (on Bag-of-Words features) among the keyrigs, and using the best-matched keyrig's pose as end-result. In another example, if it is determined that the system is well on-track before lost, then select a search over only the local (e.g., most recent x keyrigs) keyrigs for fast recovery. In a further example, if the system needs multiple hypotheses before further refinement, then select a search strategy that includes using the few best matches (on Bag-of-Words features). Other types of search strategies can be triggered using appropriate heuristics indicating a correspondence between the search strategy and one or more environmental variables (e.g., lighting change, visibility change due to fog, steam or mist, etc.) or one or more state variables (e.g., previously was tracking well before getting lost, had just performed a previous attempt to relocalize which has now failed, etc.).
- In action 1220, the keyrigs are searched using the selected search strategy in order to find among the keyrigs a keyrig with bag of words description closest to a bag of words description of a current image.
- In action 1230, determine whether the match quality is sufficient. This can be determined by applying a threshold to a quality of match indication or by other means. For example, a match quality indicator ranges from 0, denoting complete difference, to 1, denoting an exact match. A corresponding match quality threshold can be 0.85 indicating a minimum passing match quality. If the match quality is sufficient, then continue with action 1240. Otherwise, continue with action 1290 to check whether an alternative search strategy can be employed, or if available applicable search strategies have been exhausted, and continue processing in action 1210 with an alternative search strategy or in action 1295 return an error condition indicating that the relocalization failed.
- In an action 1240, correlate feature points of the current image with mapped points from the keyrig selected in action 1220, yielding <2D, 3D> point pairings. The point pairings indicate a relationship between the 2D current image and the 3D map of the selected keyrig.
- In an action 1250, determine if the quantity of points is determined to be sufficient. This can be determined by applying a threshold to the quantity of 2D image points having a correspondence with a 3D point in the map of the selected keyrig. For example, in one implementation 6 or more points are sufficient; while in another implementation 20-30 points are required. If the quantity of points is sufficient, then continue with action 1260. Otherwise, continue with action 1290 to check whether an alternative search strategy can be employed, or if available applicable search strategies have been exhausted, and continue processing in action 1210 with an alternative search strategy or in action 1295 return an error condition indicating that the relocalization failed.

In action 1260 refine the pose from the best matched keyrig and perform perspective-n-points (PnP)—or other pose estimation method that computes a pose from 2 sets of 2D image features. While any of a wide variety of PnP implementations can be used to refine pose information, one OpenCV API called solvePnPRansac has been found to perform acceptably in an example implementation. Further description of the solvePnPRansac API can be obtained with reference to "Camera Calibration and 3D Reconstruction" docs.opencv.org/master/d9/d0c/group_calib3D.html#gsc.tab=0 (last accessed Aug. 22, 2016).

In an action 1270, determine whether the refined pose is reasonable. In one implementation a refined pose is considered reasonable if the refined pose meets criteria: (i) the refined pose is sufficiently similar (e.g., within a tolerance or below a threshold) in position and perspective from the pose of the identified keyrig selected based upon the matching in action 1220; and (ii) reprojection of 3D points in the <2D, 3D> point pairings identified in action 1240 yields a new 2D point on the 2D image plane, where the new 2D point has coordinates sufficiently similar (e.g., within a tolerance or below a threshold) to the original 2D point of the <2D, 3D> point pairing. If the defined pose is reasonable, then continue with action 1280. Otherwise, continue with action 1290 to check whether an alternative search strategy can be employed, or if available applicable search strategies have been exhausted, and continue processing in action 1210 with an alternative search strategy or in action 1295 return an error condition indicating that the relocalization failed.

Figure 12B:
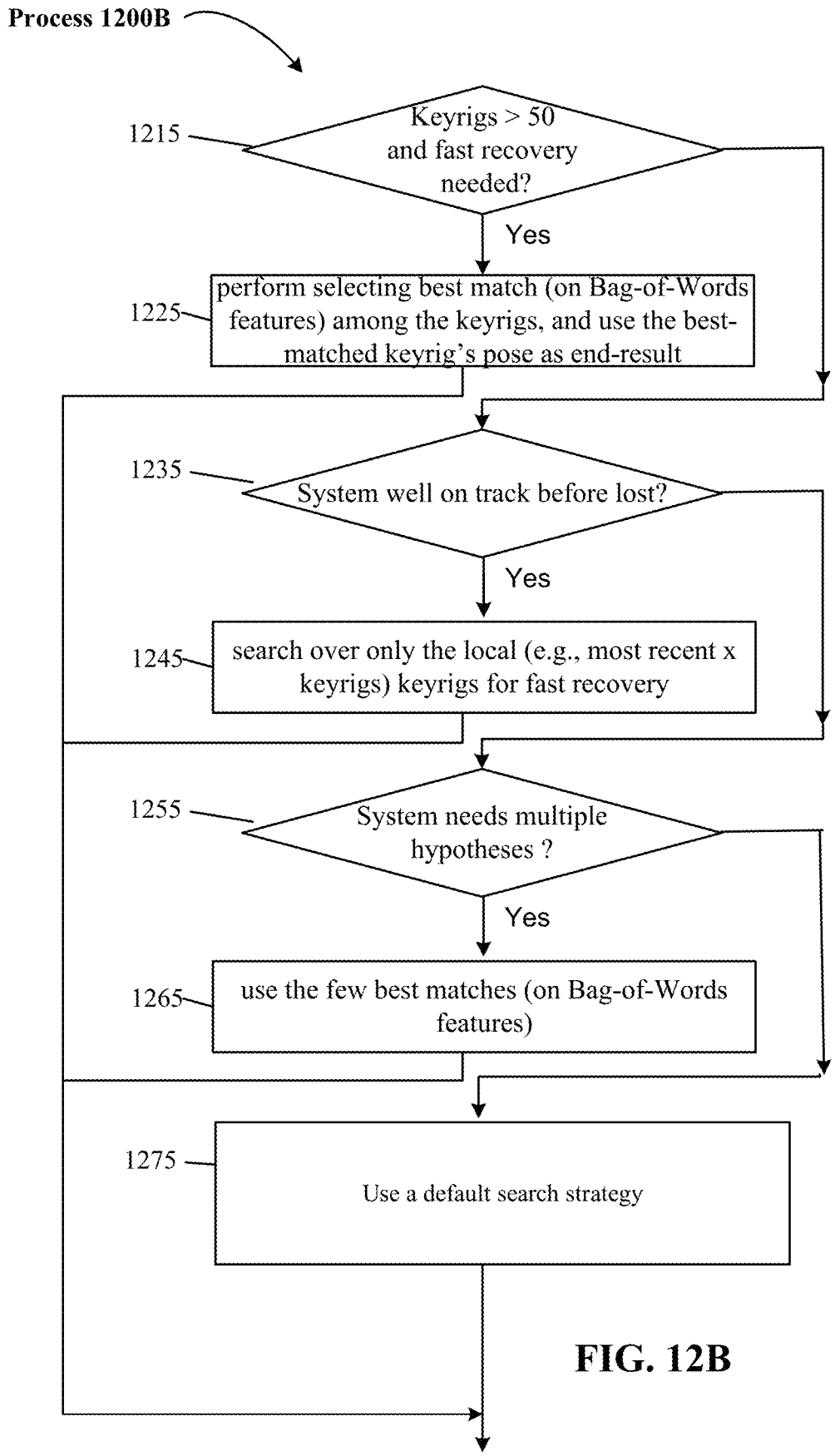
FIG. 12B illustrates an example of a relocalization search strategy selection process in one implementation.

In an action 1280, commence tracking with the refined pose. Also, record the whole recovery information, and:
update machine state with the refined pose information as the current pose
put the device back on track with some uncertainty FIG. 12B illustrates an example of a relocalization search strategy selection process in one implementation. Accordingly, one implementation of the processing 1200B provides selecting a search strategy using a situational heuristic that includes:

In action 1215, determine whether there are many keyrigs, (e.g., >50) and whether a fast recovery is needed. If this is the case, then in an action 1225, select a search strategy of performing a best match (on Bag-of-Words features) among the keyrigs, and using the best-matched keyrig's pose as end-result.

In an action 1235, it is determined whether the system was well on-track before lost. If this is the case, then in an action 1245, select a search over limited to the local keyrigs (e.g., most recent X keyrigs) for fast recovery.

In an action 1255, determine whether the system needs multiple hypotheses before further refinement. If this is the case, then in action 1265, select a search strategy that includes using the few best matches (on Bag-of-Words features).

In an action 1275 a default search strategy is selected in the event that a situation is encountered that does not meet criterion specified by at least one of the heuristics. Other types of search strategies can be triggered using appropriate heuristics indicating a correspondence between the search strategy and one or more environmental variables (e.g., lighting change, visibility change due to fog, steam or mist, etc.) or one or more state variables (e.g., previously was tracking well before getting lost, had just performed a previous attempt to relocalize which has now failed, etc.).

Geometric information obtained by 3D feature-based tracking is used to construct a hybrid grid that represents the features in a map useful in guiding a mobile device. The process of performing this task is described next with reference to examples depicted by FIGS. 19 and 20.

Mapping

In implementations, geometric information obtained by a 3D feature-based tracking process is represented using a descriptive point cloud representation. The descriptive point cloud is a set of sparse 3D points, where each point encodes a 3D geometric location, an uncertainty of the geometric location, and a set of 2D location plus appearance-based descriptors, each observed by a keyrig. A keyrig contains (i) a Timestamp where the images in the keyrig is captured; (ii) a pose (i.e. the transformation from the visual-inertial sensor's 500 coordinate to the map coordinate at the current time) and its uncertainty; and (iii) a sequence of IMU readings starting from a first temporal point before the timestamp to a second temporal point after the timestamp. Some implementations further include a flag to specify whether the visual-inertial sensor 500 is moving or static. This flag can be set from information obtained from the IMU readings.

Hybrid Representation

Implementations represent the spatial information perceived by a 3D feature-based mapping system and optionally an active ranging sensor (placed in parallel to the ground plane) using a hybrid point grid representation. One example implementation of a hybrid point grid representation combines a descriptive point cloud and a multi-layer 2D occupancy grid map.

The occupancy grid map can be a plane oriented substantially perpendicular to the direction of gravity. Each layer has a specific height. (The layer on the floor is typically 0 according to one convention). FIG. 13 illustrates an example of an occupancy grid map in one implementation. Occupancy grid 1300 of FIG. 13 indicates a single layer, such as a floor layer 1302, mapped by an implementation of the visual-inertial sensor 500. The white portions of occupancy grid 1300 indicate empty space—in other words space that has been determined by visual-inertial sensor 500 to be unoccupied. For example, when visual-inertial sensor 500 is able to look through the room door and window to note space beyond the walls of the room that is unoccupied, these regions are marked accordingly in occupancy grid 1300. Portions in solid black indicate space that is occupied by an object or obstacle. The gray portions indicate space that the visual-inertial sensor 500 has not yet determined whether these spaces are occupied or empty.

A 3 degrees of freedom transform that relates the descriptive point cloud coordinates to the gravity-based coordinates. For example, if the normal vector of the ground plane (i.e., gravity) is known, first rotate the point cloud so that the z-axis of the point cloud is parallel to the gravity, using a 3-by-3 rotation matrix R=R_pitch*R_roll. Then, (optionally) translate the point by [0, 0. T_z] so that the z=0 is on the ground plane. Note, a normal 3-by-3 rotation matrix has 3 degrees of freedom (R_yaw,*R_pitch*R_roll), however in this case are only 2 degrees. A normal 3-by-1 translation has 3 degrees of freedom ([t_x, t_y, t_z]), but here there is only 1 degree.

Creating a Point Cloud for Features Representation

Implementations incrementally create a descriptive point cloud from the results of 3D feature-based tracking by adding keyrigs according to a criterion, such as in a following example. Result of 3D feature based tracking is received in sets of image data that include feature points and pose information. The pose information includes a location of the mobile device and view of the camera that captured the image data. These sets are referred to collectively as keyrigs. Accordingly, an implementation builds a descriptive point cloud by selecting keyrigs using one or more criteria such as for example the following:

- The first image frame is selected as a keyrig, and the device coordinate frame at that timestamp become the coordinates of the descriptive point cloud. This establishes a frame of reference.
- The latest keyrig's timestamp is less than current timestamp for a time threshold (typically 2 sec).
- The distance between the current tracked pose to the latest keyrig's location is larger than a threshold (e.g., x meters).
- The distance between the current tracked pose to the latest keyrig's pointing angle is larger than a threshold (e.g., y degrees)
- The current image contains a percentage of features not included in the current descriptive point cloud.
- The device is currently static. This information can be obtained from inertial information from the IMU's signals.

If the keyrig being considered for addition contains features not included in the current descriptive point cloud, triangulate the new features from images captured from the device at this timestamp to obtain the points in the device's coordinate frame. Add the new points to the map by transforming the points from the device's coordinate frame to the map's coordinate frame. Noteworthy is that some implementations include one or more of (i) triangulating new feature points across images from a current/same keyrig (e.g. between left and right cameras), (ii) triangulating new feature points across images from two different keyrigs, wherein the two different keyrigs are not necessarily in sequence (e.g. left camera from keyrig 1 to left camera from keyrig 10), and (iii) triangulating new feature points from images in keyrigs chosen based upon a criterion (e.g., smart selection of an "optimal" keyrig). The transform is determined using feature-based tracking or other methods.

Refining a Point Cloud

In one implementation, a descriptive point cloud from the 3D feature-based tracking is refined by obtaining an "optimal" (i) pose of each keyrig and (ii) 3D locations of all the points that minimizes weighted sum of re-projection errors of all the points projected to their observed keyrigs, and (iii) optionally, the accelerometer readings from keyrigs with static flag must be [0, 0, 1] to force the z-axis of the map coordinate to be closer to gravity direction, while fulfilling the following constraint (if applicable): the pose moves along a plane (if the device is mounted on a vehicle with planar motion).

In one implementation, refining a descriptive point cloud from the 3D feature-based tracking is performed with limited computation resources by the following processing:

- Randomly sample N number of keyrigs from the entire set of keyrigs.
- Accurately refine the pose of the sample set of keyrigs and the 3D points observed in these keyrigs by minimizing the weighted sum of the (i) re-projection errors of all the points projected to their observed keyrigs, and (ii) optionally, the accelerometer readings from keyrigs with static flag must be [0, 0, 1] to force the z-axis of the map coordinate to be closer to gravity direction, while fulfilling the following constraints (if applicable): the pose moves along a plane (if the device is mounted on a vehicle with planar motion).
- Repeat the sampling and minimizing except fixing the 3D points and the poses that have already been optimized from the previous iteration.
- Iterate until a desired percentage of keyrigs and points are optimized.

In one implementation, refining a descriptive point cloud from the 3D feature-based tracking is performed with limited computation resources by the following processing:

- Randomly select a first subset of keyrigs from the entire set of keyrigs, and classify the keyrigs from the first subset of keyrigs as free keyrigs.
- Select a second subset of keyrigs that share a field of view with keyrigs in the first subset of free keyrigs, and classify the keyrigs from the second subset of keyrigs as free keyrigs.
- Classify any keyrig not included in the first and second subsets of free keyrig as fixed keyrigs.
- Classify 3D points into 3 categories: (i) free 3D point: 3D points within a viewpoint of more than two keyrigs, including at least one free keyrig from the first and second subsets of free keyrigs, (ii) semi-free 3D point: 3D points within a viewpoint of one free keyrig from the first and second subsets of free keyrigs, and (iii) fixed 3D point: 3D points within a viewpoint of only fixed keyrigs.
- Refining the point cloud by optimizing the free 3D points.

Figure 14:
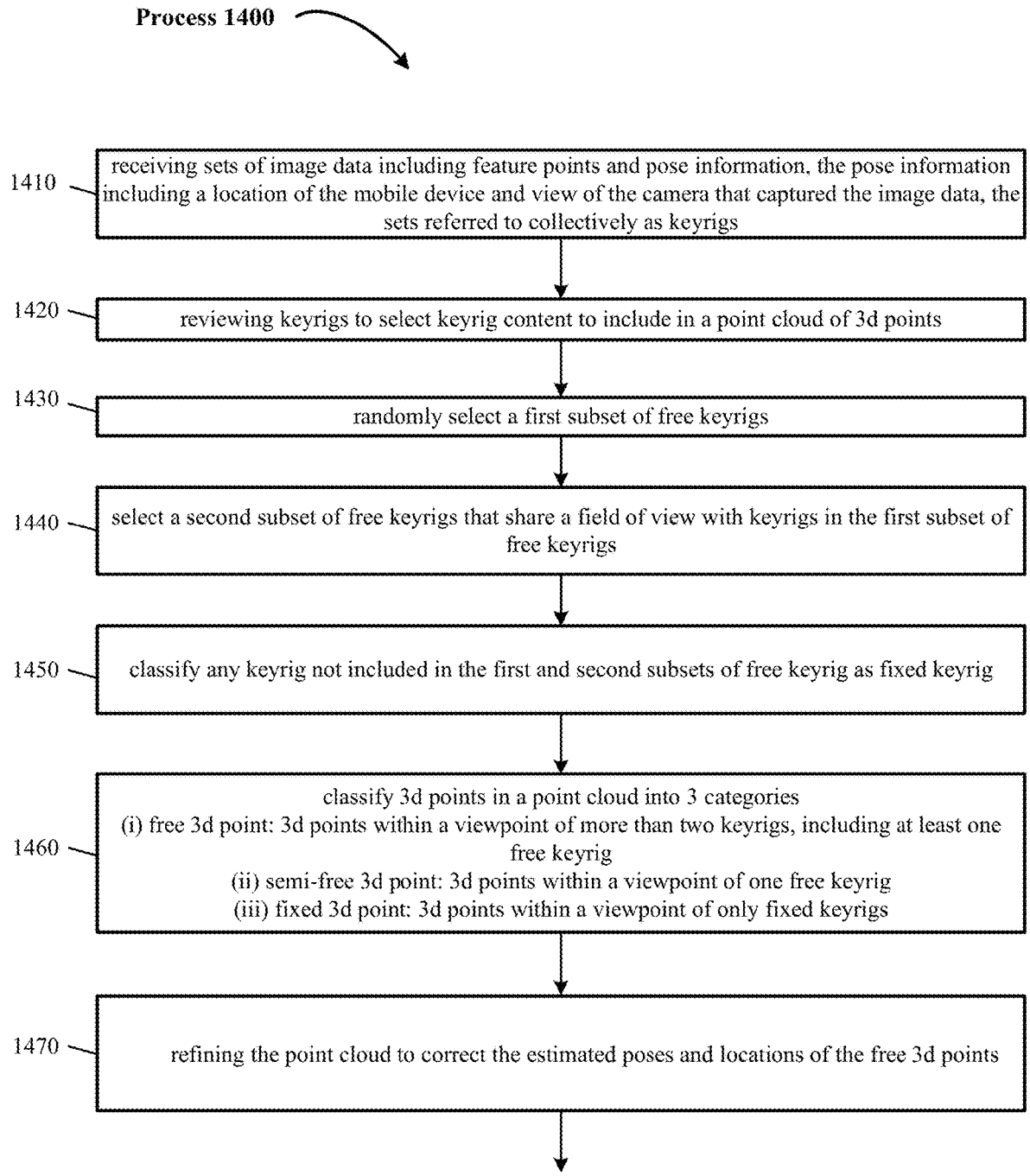
FIG. 14 is a representative method of refining 3D points and poses of keyrigs in a point cloud to guide a mobile device that includes cameras with distance calculation and multi-axis inertial measuring unit (IMU).

FIG. 14 is a representative method 1400 of refining 3D points and poses of keyrigs in a point cloud to guide a mobile device that includes cameras with distance calculation and multi-axis inertial measuring unit (IMU). Flowchart 1400 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 14. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

At action 1410, sets of image data including 3D feature points and pose information are received. The pose information includes a location of the mobile device and the view of the camera that captured the image data. The sets are collectively referred to as keyrigs. The visual sensor is disposed on a mobile platform, such as a robot, autonomous vehicle, or other autonomous or guided mobile platform.

At action 1420, a set of keyrigs are reviewed to select keyrig content to be included in a map of 3D points.

At action 1430, a first subset of keyrigs is randomly selected from the entire set of keyrigs, and the keyrigs from the first subset of keyrigs are classified as free keyrigs.

At action 1440, a second subset of keyrigs that share a field of view with keyrigs in the first subset of free keyrigs are selected, and the keyrigs from the second subset of keyrigs are classified as free keyrigs.

At action 1450, any keyrig not included in the first and second subsets of free keyrig are classified as fixed keyrigs.

At action 1460, 3D points are classified into 3 categories: (i) free 3D point: 3D points within a viewpoint of more than two keyrigs, including at least one free keyrig from the first and second subsets of free keyrigs, (ii) semi-free 3D point: 3D points within a viewpoint of one free keyrig from the first and second subsets of free keyrigs, and (iii) fixed 3D point: 3D points within a viewpoint of only fixed keyrigs.

At action 1470, the free 3D points are optimized, resulting in a more refined point cloud.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In one implementation, refining a descriptive point cloud from the 3D feature-based tracking can be performed every N seconds. In one implementation, N can be 1 second.

In one implementation, refining a descriptive point cloud from the 3D feature-based tracking is performed when the difference between the current location of the mobile device and the last triggering pose is larger than a threshold, i.e. when the device has moved more than X meter or has changed orientation more than Y degree. In one implementation, X can be 0.5 meter. In one implementation, X can be greater than 0.5 meter. In one implementation, Y can be greater than 40 degrees.

In one implementation, refining a descriptive point cloud from the 3D feature-based tracking is performed when a current pose is sufficiently distinct enough in comparison to a plurality of keyrigs in the map. In one implementation, being sufficiently distinct includes the mobile unit traveling more than 0.5 meter. In one implementation, sufficiently distinct includes the mobile unit rotating more than 40 degrees.

Creating a Hybrid Point Grid

In one implementation, an initial hybrid point grid representation is created from a descriptive point cloud using the following processing:

Transform the descriptive point cloud from its original coordinate frame to a coordinate frame where z-axis is along the gravity direction. This transformation has 2 degrees of freedom (in rotation).

Initialize a 2D occupancy grid map for layers that cover the x-y points in the descriptive point cloud.

Each layer of the occupancy grid map is filled in by points (in the descriptive point cloud) within a height range using ray tracing process.

Refining a Hybrid Point Grid

In one implementation, the hybrid point grid representation is refined using information from active sensors using the following processing:

Obtain the pose, (transform from the device coordinate to the map's coordinate) where each active sensor's signal is captured, from the trajectory of the device in the map's coordinate frame.

Use ray tracing process to update the 2D occupancy grid map.

In one implementation, the refining hybrid point grid representation from an updated descriptive point cloud is performed using the following processing:

Transform the descriptive point cloud's coordinate frame to the gravity-based coordinate frame.

Use ray tracing process to determine which cells to update from each point in the descriptive point cloud.

Estimating a Trajectory for a Guided Device

In one implementation, an offline trajectory of a device between two consecutive keyrigs (i.e. from keyrig k to keyrig k+1) in a descriptive point cloud is estimated using the following processing:

Initialize the image frame that creates keyrig k to be at its pose stored in the descriptive point cloud.

Use the "3D feature-based tracking process" as described herein under section heading "Tracking" to track the image frames between the two keyrigs. Each image frame has a 6-degrees of freedom pose, and a set of correspondences of 3D map point to 2D image observed location.

Force the image frame that creates keyrig k+1 to be at its pose stored in the descriptive point cloud.

Figure 15:
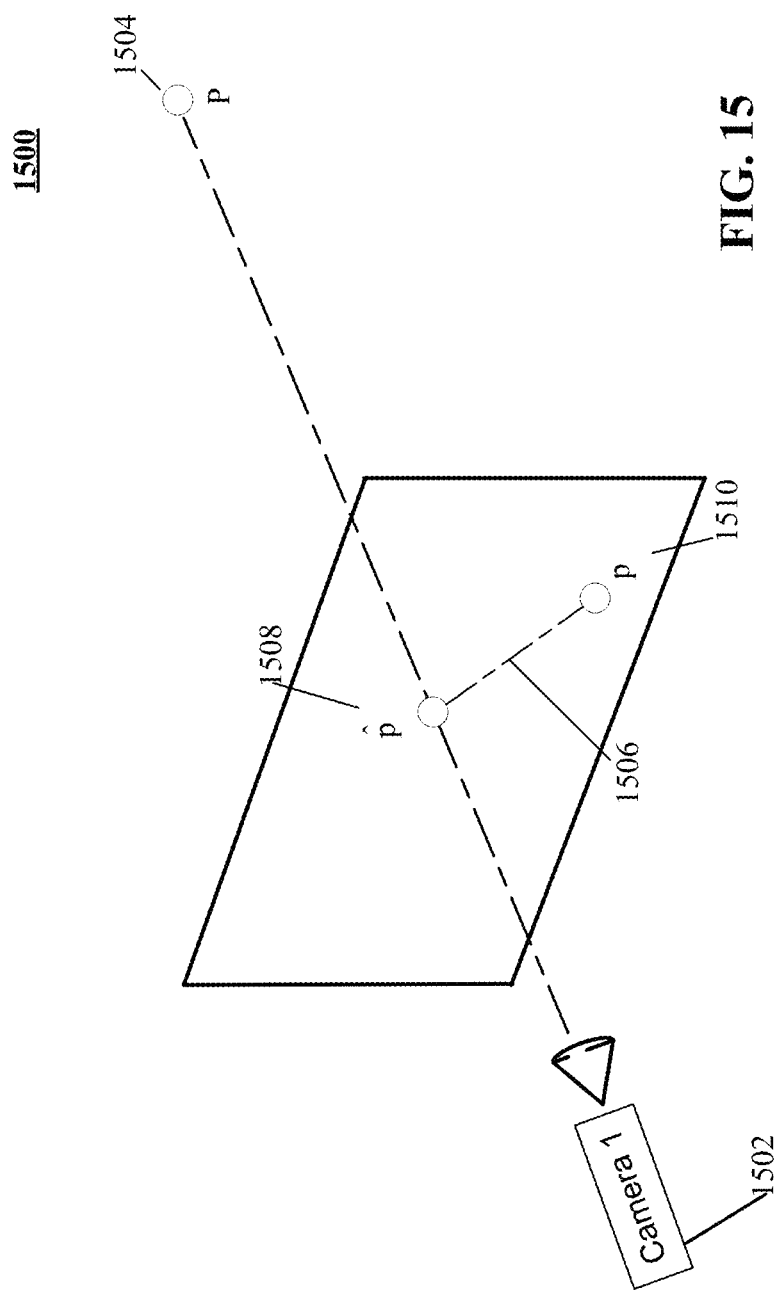
FIG. 15 illustrates an example of reprojection error.

Refine all the poses by minimizing the sum of reprojection errors of all observed locations. The reprojection error is the error between a reprojected point in the camera coordinate frame and the original point. FIG. 15 illustrates an example of reprojection 1500. In FIG. 15, some points in the reference frame of camera 1502 are used to triangulate one or more new 3D points P 1504 in the world coordinate frame. Due to errors in the calibration of the camera(s) 1502, the spatial position of point P 1504 will not be completely accurate. The reprojection error 1506 can be determined from the resulting 3D point P 1504 re-projected into the coordinates of the camera 1502 (using the calibration data for the camera), obtaining a new point $\hat{p}$ 1508 near the originally projected p 1510. The reprojection error 1506 is the straight line distance between the original point p 1510 and the reprojected point $\hat{p}$ 1508.

Estimating a Transform for a Descriptive Point Cloud and Gravity Based Frame

In one implementation, the 2 degrees of freedom coordinate transform between the descriptive point cloud to a coordinate where z-axis is along the gravity direction is estimated using any of the following methods:

Measuring the gravity direction from IMU (accelerometer) while it is static, and find a rotation matrix that transforms the gravity direction to [0, 0, 1].

Obtain at least 3 points on the ground-plane from the descriptive point cloud to estimate the ground-plane's normal in the original coordinate. Find a rotation matrix that transforms the ground-plane's normal to [0, 0, 1] or [0, 0, −1].

Offline calibrate the relation between the visual-inertial sensor 500 to the ground by placing a known planar pattern on the ground to determine the rotation matrix.

Robot Implementation

Figure 16:
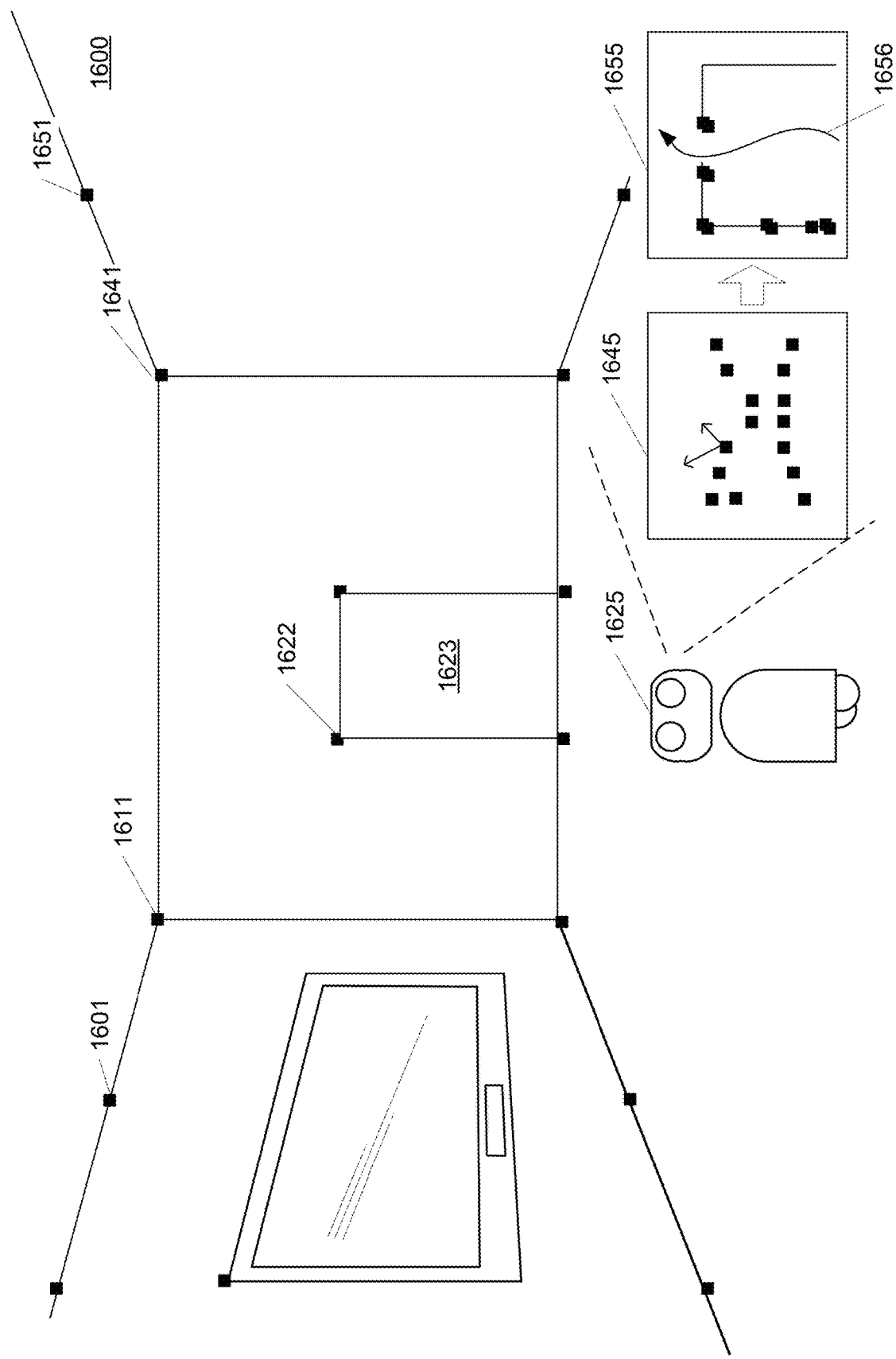
FIG. 16 illustrates an example robot guidance application in which one implementation can be embodied.

FIG. 16 illustrates an example model of robot guidance using image and inertial information techniques described herein. Examples of robot applications that benefit from employing positional awareness techniques such as described herein include:

Caregiver and Service robots (traveling on a ground plane)

A robot vacuuming/mopping/cleaning the floor.

A robot being commanded to carry objects around the environment.

A telepresence robot moving around a remote environment automatically.

A robot butler that follows a person around.

In each of the scenarios listed above, the robot utilizes the technology disclosed herein in order to track its own location and to recognize the objects that it encounters. Also, since the robot performs many complex tasks, each with real-time constraints, it is beneficial that the sensing be done rapidly to accelerate the perception pipeline. In implementations, this can be achieved by offloading some computation from the main processor to the visual-inertial sensor 500. In addition, since it is a mobile robot, which carries limited storage capacity battery, energy consumption is a design point. In implementations, some computational tasks are off loaded from the main processor to the visual-inertial sensor 500 to reduce power consumption, thereby enabling implementations to achieve overall energy efficiency. Cost is an issue in mobile robots, since lowering the cost of the robot makes the robot affordable to more customers. Hence cost can be another factor for sensor and guidance system design. In implementations, one low-cost grayscale sensor is used for localization tasks, and one colored sensor for recognition tasks. This design point enables these implementations to significantly reduce the cost over a stereo colored sensor designs without sacrificing performance.

In FIG. 16, the walls, corners and door 1623 of room 1600 as well as the travels of service robot 1625 on the floor of room 1600 are reflected in the hybrid point grid, comprised of descriptive point cloud 1645 and occupancy grid 1655, developed by the visual-inertial sensor 500 using the technology described herein above in the Mapping section. The occupancy grid 1655 is a part of the hybrid point grid that is a layer of the multi-layer 2D occupancy grid map described in the Mapping section. To build a map of an unknown (newly exposed) environment, the visual-inertial sensor 500 equipped robot 1625 keeps track of its pose using the technology described herein above in the Tracking section while incrementally building an initial descriptive point cloud using the technology described herein above in the Mapping section. Then, the robot 1625 builds an occupancy grid 1655 to complete the hybrid point grid from the initial descriptive point cloud 1645 using the technology described herein above in the Mapping section.

Obtain Real Time Image and Inertial Information

In order to track its location, the robot senses its own movement through visual-inertial sensor 500. The visual-inertial sensor 500 generates reliable inertial data so that the tracking and mapping pipeline that follows can accurately infer the robot's location. FIG. 16 illustrates an example robot guidance application in which one implementation can be embodied. As illustrated by FIG. 16, robot 1625 implements visual-inertial sensor 500 to self-localize within a room 1600. The robot 1625 in FIG. 16 employs the cameras 508, 510 of a visual sensor 500 in order to capture image frames of the surrounding environment of room 1600. The images are processed according to the technology disclosed herein above under the Sensor Visual Data Generation and Processing section as follows:

Detect and Describe Features in Captured Images

Visual-inertial sensor 500 determines feature points 1601, 1611, 1641, 1651, 1622, and so forth for the walls, corners and door 1623 of room 1600 from the information in the captured image frames. In some implementations, Shi-Tomasi feature detection is employed to determine the feature points 1601, 1611, 1641, 1651, 1622 from the image frames. Features are assigned descriptors using ORB feature description. Optical flow techniques are used to determine 2D correspondences in the images, enabling matching together features in different images.

Map Feature Descriptors to a Hybrid Point Grid

The visual-inertial sensor 500 equipped robot 1625 can build a descriptive point cloud 1645 of the obstacles in room 1600 enabling the robot 1625 to circumnavigate obstacles and self-localize within room 1600. Visual-inertial sensor 500 creates, updates, and refines descriptive point cloud 1645 using feature descriptors determined for room features indicated by points 1601, 1611, 1641, 1651, 1622 using the technology disclosed herein above under the Mapping sections. As depicted schematically in FIG. 16, descriptive point cloud 1645 includes coordinates and feature descriptors corresponding to the feature points 1601, 1611, 1641, 1651, 1622 of room 1600. Visual-inertial sensor 500 prepares an occupancy map 1655 by reprojecting feature points 1601, 1611, 1641, 1651, 1622 onto a 2D layer corresponding to the floor of the room 1600. In some implementations, second and possibly greater occupancy maps are created at differing heights of the robot 1625, enabling the robot 1625 to navigate about the room 1600 without bumping its head into door soffits, or other obstacles above the floor.

Now with renewed reference to FIG. 13, which illustrates an example of an occupancy grid 1300, the white portions indicate empty space—in other words space that has been determined by visual-inertial sensor 500 to be unoccupied. Portions in solid black indicate space that is occupied by an object or obstacle. The gray portions indicate space that the visual-inertial sensor 500 of robot 1625 has not yet determined whether these spaces are occupied or empty.

The descriptive point cloud 1645 and occupancy grid 1655 comprise a hybrid point grid that enables the robot 1625 to plan paths of travel through room 1600, using the occupancy grid 1655 and self-localize relative to features in the room 1600 using the descriptive point cloud 1645.

Using the Occupancy Grid and Path Planning

When the robot is activated in a previously mapped environment, the robot uses the technology described herein above in the Tracking sections to self-locate within the descriptive point cloud 1645. The descriptive point cloud 1645 and occupancy grid 1655 comprise a hybrid point grid representation that is key to enabling robot action (i.e. moving on the floor) using passive sensors because the robot uses the occupancy grid 1655 in order to plan a trajectory 1656 from its current location to another location in the map using the technology described herein above in the Mapping sections. A person or entity can also command the robot to go to a specific point in the occupancy grid 1655. While traveling, the robot uses the descriptive point cloud 1645 to localize itself within the map as described herein above in the Tracking sections. The robot can update the map using the techniques described herein above in the Mapping sections. Further, some implementations equipped with active sensors (e.g. sonar, LIDAR) can update the map using information from these sensors as well.

VR/AR Implementations

Figure 17:
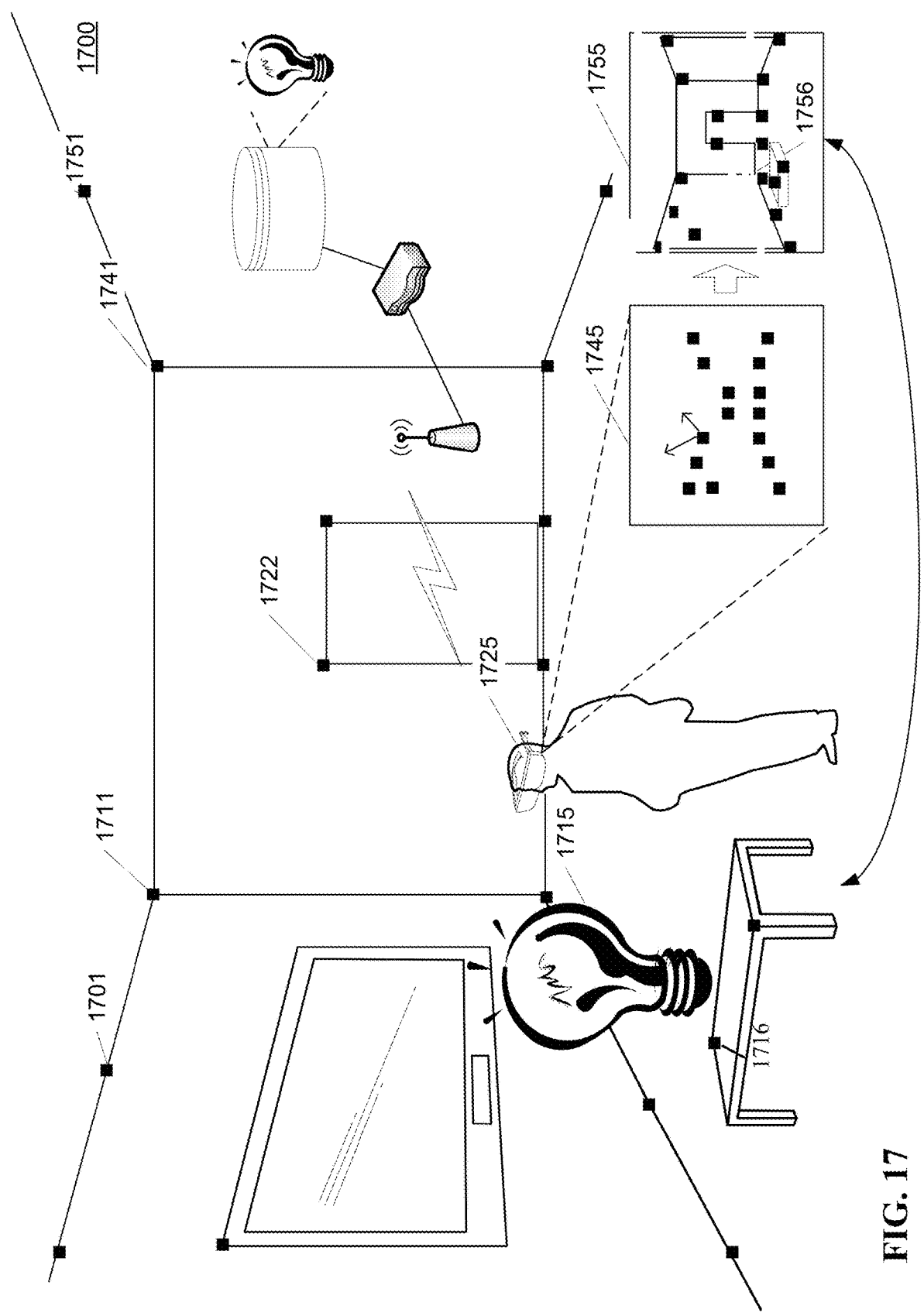
FIG. 17 illustrates an example VR application in which one implementation can be embodied.

In both AR and VR usage scenarios, the headset, goggles or other VR/AR presentation device employs the visual-inertial sensor 500 to track its own location, and in some applications recognizes the objects that it encounters. In order to track its location, the VR/AR presentation device needs to sense its own movement, which is accomplished using the visual-inertial sensor 500 technology described herein. Accordingly, the visual-inertial sensor 500 generates reliable inertial data so that the tracking and mapping pipeline that follows can accurately infer the VR/AR presentation device's location. FIG. 17 illustrates an example VR application in which one implementation can be embodied.

In FIG. 17, a user wears a VR/AR presentation device, headset 1725. Headset 1725 is equipped with a visual-inertial sensor 500 creates, updates, and refines descriptive point cloud 1745 using feature descriptors determined for room features indicated by points 1701, 1711, 1741, 1751, 1722 of room 1700 and points 1716 of objects within room 1700 using the technology disclosed herein above under the Mapping sections. As depicted schematically in FIG. 17, descriptive point cloud 1745 includes coordinates and feature descriptors corresponding to the feature points 1701, 1711, 1741, 1751, 1722 of room 1700 and points 1716 of objects within room 1700. Visual-inertial sensor 500 prepares hybrid point grid 1755 of the room 1700 mapping space by reprojecting feature points 1701, 1711, 1741, 1751, 1722 and 1716 onto 2D layers corresponding to various heights above (and including) the floor where feature points were found within the room 1700. Accordingly, hybrid point grid 1755 provides a mapping of the space in room 1700 by stacked 2D layers indicating feature points corresponding to boundaries and objects in the room 1700. In some implementations, free space 1756 can be identified by the visual-inertial sensor 500 as available for display of VR presentation 1715 and communicated to the VR presentation mechanisms of headset 1725 enabling headset 1725 to appropriately render VR presentation 1715 to appear within space 1756 to the wearer.

Headset 1725 can be communicatively coupled to a source of content for presenting VR presentation 1715 to the wearer. While depicted as a wireless connection to a hotspot coupled to a network gateway that further couples to a source of content for VR presentation 1715, headset 1725 can be coupled to presentation content using any of a wide variety of mechanisms, wired or wireless. Further, presentation content for rendering VR presentation 1715 can be downloaded and stored on some headset 1725 implementations.

The foregoing operational principles are easily applied to other common VR applications such as gaming and socially enabled experiences. In gaming for example, game play is conducted by users while wearing a VR/AR presentation device. The game is displayed to a user ("gamer") by the VR/AR presentation device. The visual-inertial sensor 500 equipped VR/AR presentation device conducts orientation tracking, translation movement of the gamer that can be reflected to the game displayed by the VR/AR presentation device, enabling the gamer to move freely within a certain area of surrounding space. A visual-inertial sensor 500 equipped VR/AR presentation device provides mobile VR games with such "inside-out" e.g., integrated within the VR/AR presentation device, tracking thereby obviating the need for some kind of external position sensors such as are required by conventional VR/AR headsets. Yet further, if the gamer uses the VR/AR presentation device frequently in the same area, e.g., the gamer's living room, the visual-inertial sensor 500 can smartly re-use or update an existing (e.g., previously created by the visual-inertial sensor 500) map of this space to provide position tracking.

In socially enabled experiences for example, a celebrity/sports star/singer (creator) performs live in front of a stereo video camera that provides a live video stream as content to fans. Fans wearing a VR/AR presentation device equipped with the visual-inertial sensor 500 (attached or embedded) can consume this live video feed as a VR presentation. When the fans get excited/sad/happy, they move about just as they would during an in person live experience. The visual-inertial sensor 500 performs position tracking, and provides input to the VR/AR presentation device enabling adjusting the live video feed accordingly based on the position tracking. Accordingly, the fans and creator can "interact" with the help of the disclosed technology.

Figure 18:
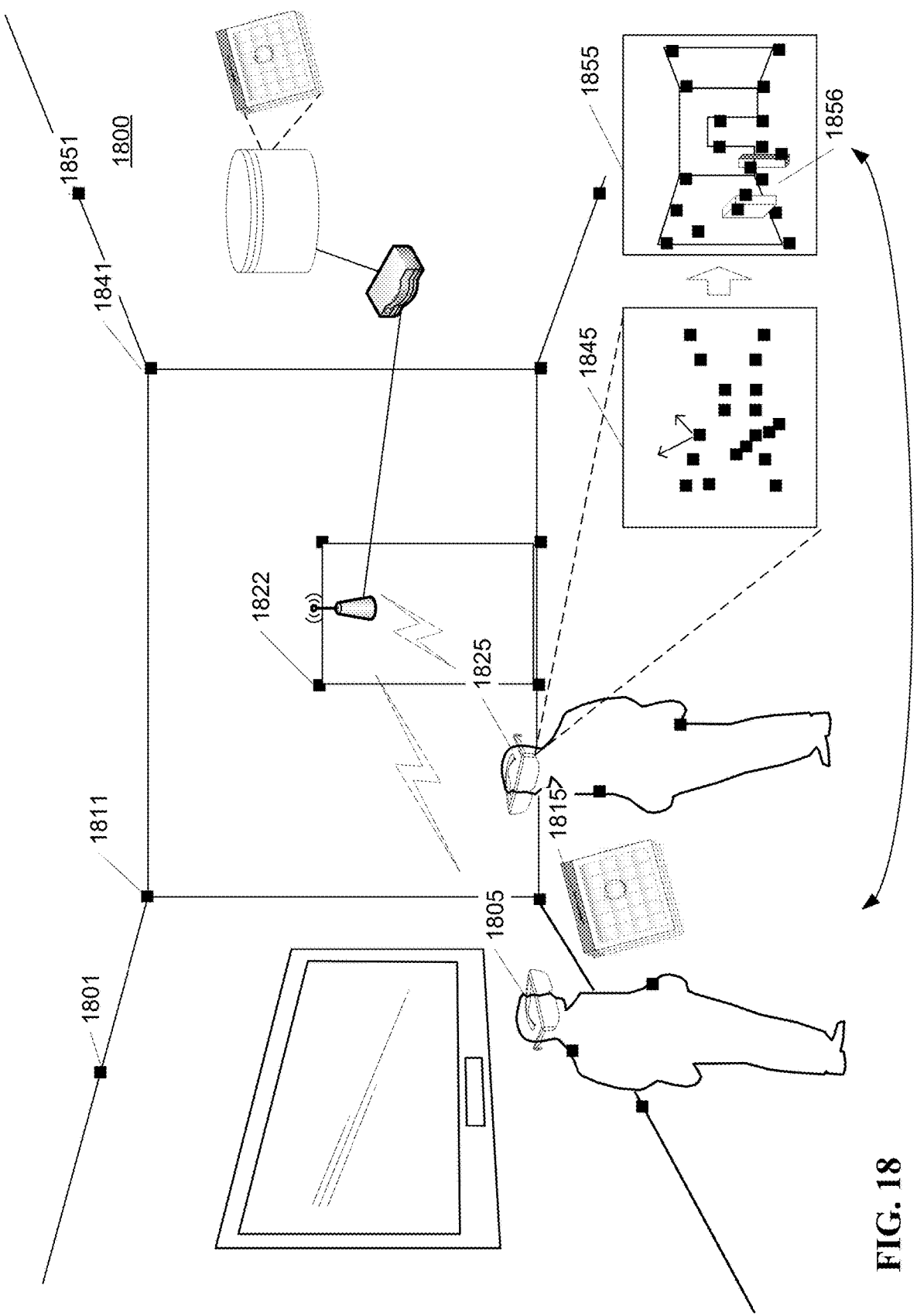
FIG. 18 illustrates an example AR application in which one implementation can be embodied.

FIG. 18 illustrates an example AR application in which one implementation can be embodied. In FIG. 18, two users wear VR/AR presentation devices, headsets 1805, 1825. Headsets 1805, 1825 are equipped with a visual-inertial sensor 500 that creates, updates, and refines descriptive point cloud 1845 using feature descriptors determined for room features indicated by points 1801, 1811, 1841, 1851, 1822 of room 1800 using the technology disclosed herein above under the Mapping sections. As depicted schematically in FIG. 18, descriptive point cloud 1845 includes coordinates and feature descriptors corresponding to the feature points 1801, 1811, 1841, 1851, 1822 of room 1800. Visual-inertial sensor 500 prepares hybrid point grid 1855 of the room 1800 mapping space by reprojecting feature points 1801, 1811, 1841, 1851, 1822 of room 1800 onto 2D layers corresponding to various heights above (and including) the floor where feature points were found within the room 1800. Accordingly, hybrid point grid 1855 provides a mapping of the space in room 1800 by stacked 2D layers indicating feature points corresponding to boundaries and objects in the room 1800. In some implementations, objects 1856 corresponding to the wearers can be identified by the visual-inertial sensor 500 of the other wearer and reflected in hybrid point grid 1855. Further, free space between the objects 1856 corresponding to the wearers is made available for display of AR presentation 1815, in this case a virtualized rendering of a project schedule that the wearers are discussing during a business meeting, and communicated to the VR/AR presentation mechanisms of headsets 1805, 1825, enabling the headsets 1805, 1825 to appropriately render AR presentation 1815 to appear within space between objects 1856 corresponding to the wearers.

Headsets 1805, 1825 can be communicatively coupled to a source of content for presenting AR presentation 1815 to the wearer(s). While depicted as a wireless connection to a hotspot coupled to a network gateway that further couples to a source of content for AR presentation 1815, headsets 1805, 1825 can be coupled to presentation content using any of a wide variety of mechanisms, wired or wireless. Further, presentation content for rendering AR presentation 1815 can be downloaded and stored on some headsets 1805, 1825 implementations.

The foregoing operational principles are easily applied to other common AR applications such as gaming, socially enabled experiences and industrial applications. Like VR gaming, in AR gaming, game play is conducted by users while wearing a VR/AR presentation device. Gamers can move freely about the room(s) while the visual-inertial sensor 500 equipped VR/AR presentation device tracks the gamer' position. The VR presentation device manages positioning virtual things in the real world environment because of the accurate mapping of the real world environment provided by the visual-inertial sensor 500. Accordingly, the AR gamer can participate in virtual battles in their own living room, accouter their kitchen with virtual overlays of 18$^{th}$ century kitchen items and so forth. Each virtual item can be positioned accurately and realistically into the gamer's real world using the position and localization information provided by the virtual-inertial sensor 500.

In socially enabled experiences for example, video chat applications for VR can enable a user to conduct a video chat with their best friend Tom, and a virtual Tom (displayed using an AR goggles, VR headset, projected by robot or other presentation rendering devices) appears in a position of the user's house. The user can walk around virtual Tom, change the presentation—making him larger or smaller or even changing the rendering altogether clothing him in a hat and suit typically worn by Napoleon.

Many other applications of virtual-inertial sensor 500 equipped VR/AR presentation devices exist. Virtual shopping trips, remote real estate showings, bicycle rides captured and replayed during indoor cycling sessions, virtual flight instruction, indoor/outdoor position tracking for hikes, bike rides, motorcycle travel and so forth.

In each of the scenarios listed above, the VR/AR presentation device utilizes the technology disclosed herein in order to track its own location and to recognize the objects that it encounters. Also, since the VR/AR applications include many complex tasks, each with real-time constraints, it is beneficial that the sensing be done rapidly to accelerate the perception pipeline. In implementations, this can be achieved by offloading some computation from the main processor to the visual-inertial sensor 500. In addition, since many VR/AR presentation devices can be wearable—or at least portable—the VR/AR presentation device carries limited storage capacity battery, energy consumption is a design point. In implementations, some computational tasks are off loaded from the main processor to the visual-inertial sensor 500 to reduce power consumption, thereby enabling implementations to achieve overall energy efficiency. Cost is an issue in VR/AR applications, since lowering the cost of the VR/AR presentation device makes VR/AR affordable to more customers. Hence cost can be another factor for sensor and guidance system design. In implementations, one low-cost grayscale sensor is used for localization tasks, and one colored sensor for recognition tasks. This design point enables these implementations to significantly reduce the cost over a stereo colored sensor designs without sacrificing performance.

Processes

Figure 19:
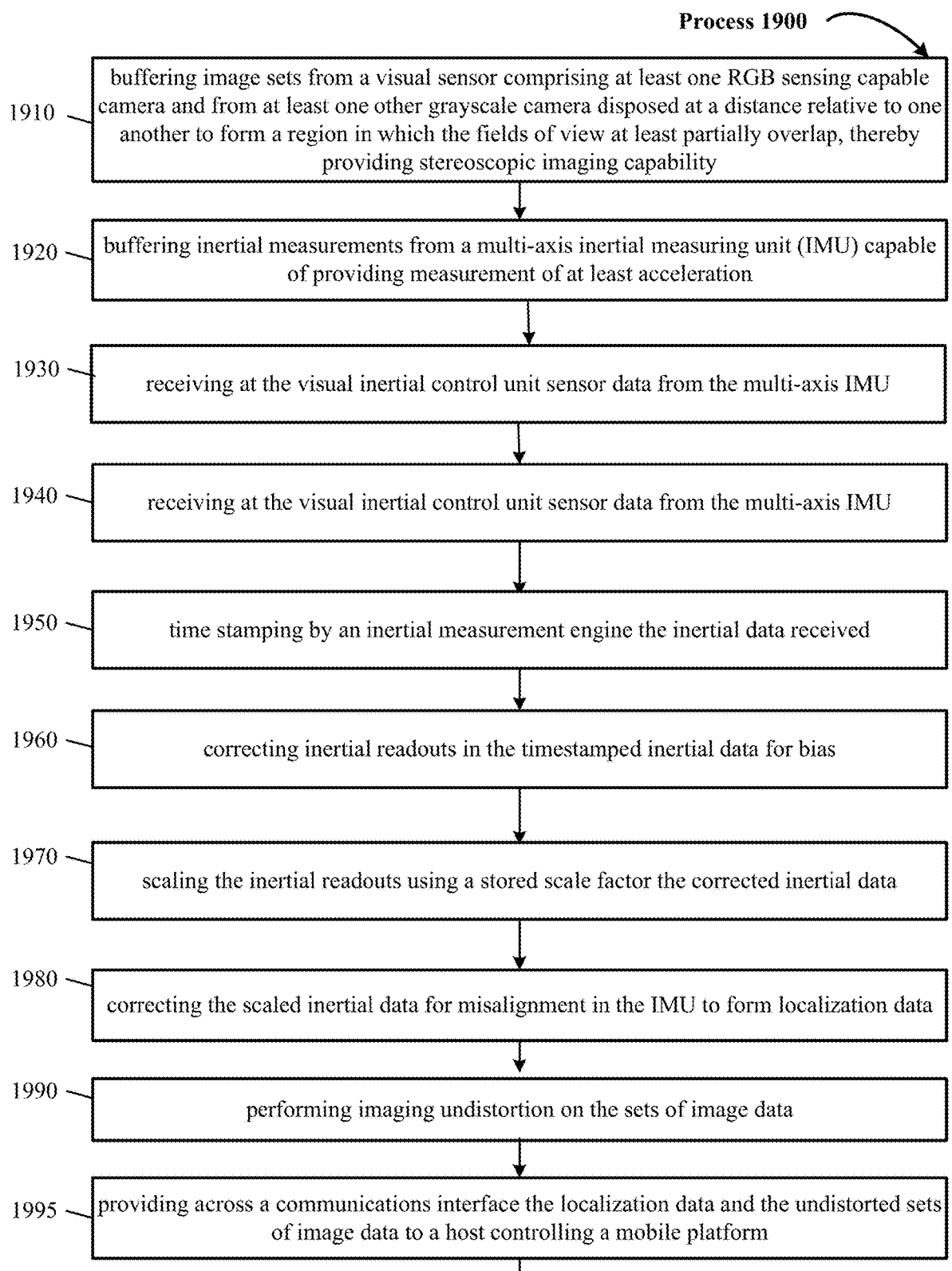
FIG. 19 is a representative method of guiding a mobile device using information from cameras with distance calculation and multi-axis inertial measuring unit (IMU).

FIG. 19 is a representative method 1900 of guiding a mobile device using information from a camera with distance calculation and multi-axis inertial measuring unit (IMU). Flowchart 1900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 19. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 19 includes process 1900 that begins at action 1910, where image sets from a visual sensor are buffered. In some implementations, image sets are received from a visual sensor comprising at least one RGB sensing capable camera and from at least one other grayscale camera. The RGB camera(s) and grayscale camera(s) can be disposed at a distance relative to one another to form a region in which the fields of view at least partially overlap, thereby providing stereoscopic imaging capability. The visual sensor is disposed on a mobile platform, such as a robot, autonomous vehicle, or other autonomous or guided mobile platform.

Process 1900 continues at action 1920 where inertial measurements from a multi-axis inertial measuring unit (IMU) capable of providing measurement of at least acceleration are buffered. The inertial measuring unit can be collocated with the visual sensor or can be disposed at an offset thereto.

At action 1930, the sets of image data are received at a visual inertial control unit.

At action 1940, the sets of sensor data from the multi-axis IMU are received at a visual inertial control unit.

At action 1950, the inertial data received is timestamped. The time stamping can be performed by an inertial measurement engine.

At action 1960, inertial readouts in the timestamped inertial data are corrected for bias.

At action 1970, the inertial readouts are scaled using a stored scale factor the corrected inertial data.

At action 1980, the scaled inertial data are corrected for misalignment in the IMU to form localization data.

At action 1990, imaging undistortion is performed on the sets of image data.

At action 1995, the localization data and the undistorted sets of image data are provided across a communications interface to a host controlling a mobile platform.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 20:
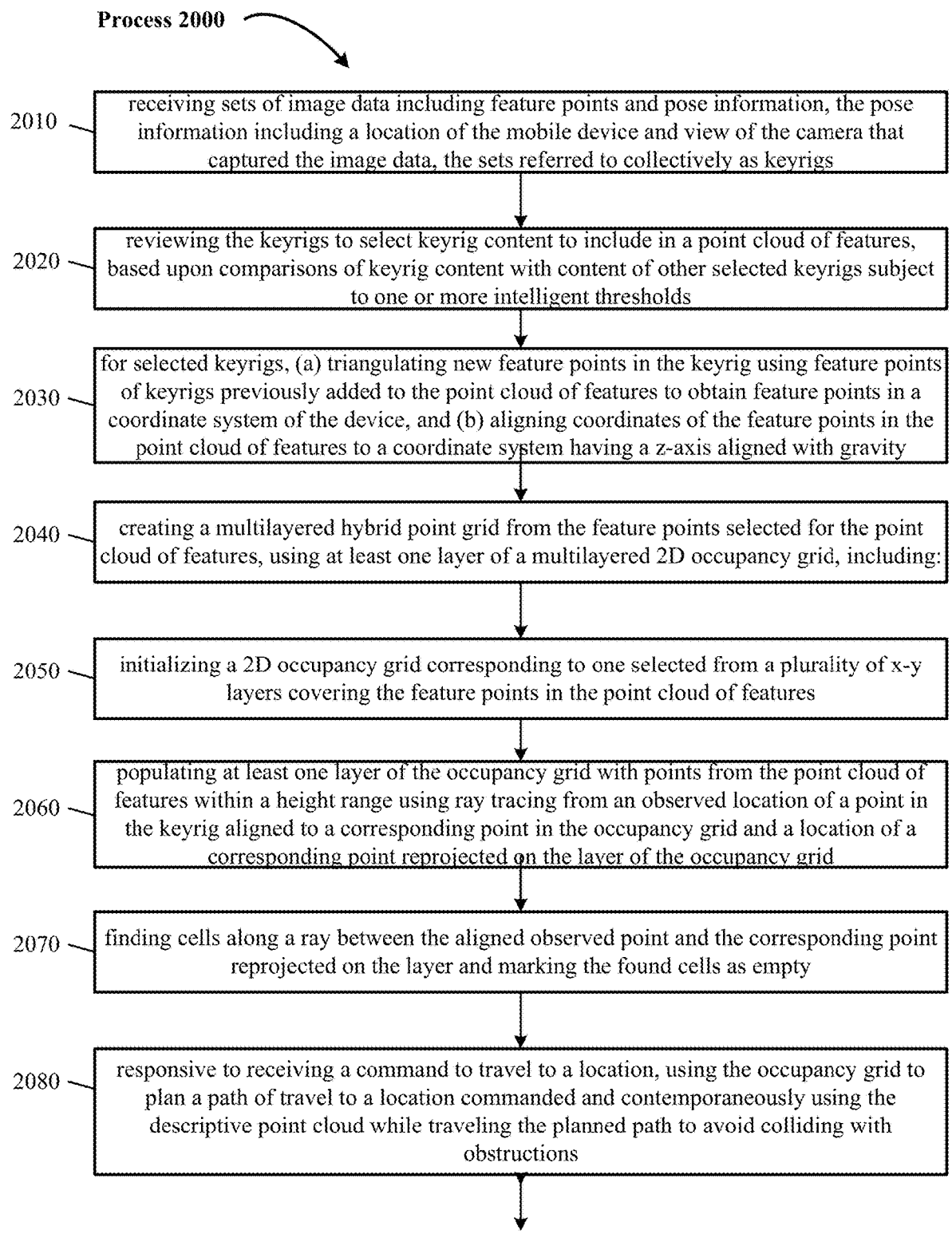
FIG. 20 is a representative method of using a hybrid point grid to guide a mobile device that includes cameras with distance calculation and multi-axis inertial measuring unit (IMU).

FIG. 20 is a representative method 2000 of using a hybrid point grid to guide a mobile device that includes a camera with distance calculation and multi-axis inertial measuring unit (IMU). Flowchart 2000 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 20. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as system overview, tracking, mapping, robot implementation, VR/AR implementation, etc.

FIG. 20 includes process 2000 that begins at action 2010, where sets of image data are received. In some implementations, the sets of image data include feature points and pose information. The pose information includes a location of the mobile device and view of the camera that captured the image data. The sets of image data are referred to collectively as keyrigs.

Process 2000 continues at action 2020 where the keyrigs are reviewed to select keyrig content to include in a point cloud of features, based upon comparisons of keyrig content with content of other selected keyrigs subject to one or more intelligent thresholds. As used herein, intelligent thresholds includes a threshold that is adaptively adjusted based upon device movement, sensor readings, situational or environmental variables (e.g., low light, fog, bright light, and so forth) or combinations thereof.

At action 2030, for selected keyrigs, (a) new feature points in the keyrig are triangulated using feature points of keyrigs previously added to the point cloud of features to obtain feature points in a coordinate system of the device, and (b) coordinates of the feature points in the point cloud of features are aligned to a coordinate system having a z-axis aligned with gravity.

At action 2040, a multilayered hybrid point grid is created from the feature points selected for the point cloud of features, using at least one layer of a multilayered 2D occupancy grid by the following:

At action 2050, a 2D occupancy grid corresponding to one selected from a plurality of x-y layers covering the feature points in the point cloud of features is initialized.

At action 2060, at least one layer of the occupancy grid is populated with points from the point cloud of features within a height range using ray tracing from an observed location of a point in the keyrig aligned to a corresponding point in the occupancy grid and a location of a corresponding point reprojected on the layer of the occupancy grid.

At action 2070, cells along a ray between the aligned observed point and the corresponding point reprojected on the layer are found and the found cells are marked as empty.

At action 2080, responsive to receiving a command to travel to a location, the occupancy grid is used to plan a path of travel to a location commanded and contemporaneously the descriptive point cloud is used while traveling the planned path to avoid colliding with obstructions.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

CONCLUSION AND ADDITIONAL IMPLEMENTATIONS

We describe a system and various implementations for guiding a mobile device that includes a camera with distance calculation and multi-axis inertial measuring unit (IMU).

Some additional implementations and features include:

In one implementation, described is a system including at least one camera and a multi-axis inertial measuring unit (IMU), and an interface to a mobile platform including one or more processors coupled to memory storing computer instructions to correct at least some estimated poses and locations of the mobile platform by maintaining a set of time dependent tracking states that include: (i) a pose, (ii) sensor configuration information and (iii) one or more frames of sensor readings including at least some frames from visual sensors which at least some frames include sets of 2D feature points located using image information from the visual sensors, and at least some frames from inertial sensors providing inertial data. The computer instructions are used to estimate the pose of the mobile platform, when executed on the processors. The implemented actions comprises of: (a) selecting two or more tracking states from the set of time dependent tracking states; (b) creating a 2D feature correspondences set comprising of common 2D feature points among the visual sensor frames from the selected tracking states; (c) triangulating 2D feature points from the 2D feature correspondences set to form a 3D point set; (d) selecting a subset of the 3D point set that includes 3D points having re-projection error within a threshold; (e) updating current poses for at least two of the tracking states within the set of time dependent tracking states subject to a criterion including reduction of a total of re-projection errors of the selected 3D points; and (f) guiding the mobile platform using the updated current pose determined for that at least two tracking states.

In one implementation, the above triangulation step further includes selecting 3D points having a triangulation error less than a determined number of pixels. In one implementation, the above triangulation step further includes adjusting the threshold for selecting 3d points to control propagation based upon a quantity of 3D points available to update poses in the set of time dependent tracking states. In one implementation, the 3D points are further refined to have lower reprojection error using a least squares function.

In one implementation, the number of tracking states in the set of time dependent tracking states is fixed and depends on the sensors. In one implementation, the number of tracking states in the set of time dependent tracking states is 30 in order to keep 1 second worth of visual sensor data for a 30 Hz camera. In one implementation, the number of tracking states in the set of time dependent tracking states is dynamically determined to maintain sensory data for a range of time. In one implementation, the number of tracking states in the set of time dependent tracking states is dynamically determined to maintain 1 second worth of sensor data. In one implementation, the number of tracking states in the set of time dependent tracking states is dynamically determined to maintain a manageable number of 2D feature points. In one implementation, the number of tracking states in the set of time dependent tracking states is dynamically determined to maintain less than 200 2D feature points.

In one implementation, time synchronization is performed for the a set of time dependent tracking states with a time maintained by a controller unit controlling the mobile platform, by updating the time associated with the time associated with at least one of the a set of time dependent tracking states by (i) a constant offset and (ii) a transfer delay.

In one implementation, the system further includes a motion detector that (a) tracks a set of inertial readings; (b) computes a variance for each dimension of a total of 3 dimensions of the set of inertial readings; (c) determines whether the mobile platform is moving or at rest based upon the variance computed; (d) whenever the mobile platform is determined to be moving, performing extended Kalman filtering on the set of time dependent tracking states to determine pose information from the set of time dependent tracking states; and (e) whenever the mobile platform is determined to be static providing a computed pose whenever the mobile platform is determined to be at rest; wherein the computed pose is determined by selectively performing at least one of: (i) propagating a zero velocity applied to location information of the pose and change orientation information of the mobile platform using information obtained from a gyroscopic sensor; and (ii) adding a noise factor to a previous pose. A variance above a threshold indicates a moving platform, and a variance below a threshold indicates a static platform In one implementation, the system detects a number of IMU updates occurring after a successful image update; and switches to gyroscopic sensor propagation after N consecutive IMU updates are detected.

In one implementation, the system has the capability of detecting when one or more visual sensors has failed or is not updating or is insufficiently updating and whenever one or more visual sensors has failed or is not updating or is insufficiently updating, using the motion detector to control pose estimation.

In one implementation, the system has the capability of detecting a number of features in an image; and dynamically adjusting an exposure value of at least one visual sensor whenever a lack of features the image is detected.

In one implementation, the system has the capability of (a) calculating a location of at least one 2D feature in an image using optical flow; (b) reducing features to features existing along an epipolar line based upon a location calculated and a prediction of a camera pose; (c) checking for similarity between descriptors of the feature and descriptors for a corresponding feature from a previous frame; (d) determining whether number of features through optical flow is less than a number of features detected in a current frame, and whenever the number of features through optical flow is less than a number of features, detecting 2D corner features directly from an image at image regions without features; and (e) bin the image spatially, and adjust a number of features in each bin so that the number of features in the bins is balanced. The system can also link features in different images captured at different times by a same camera.

In one implementation, the system has the capability of correlating unmatched features for a camera, by: (a) collecting a set of features that are not matched to any other features by existing links; (b) collecting a set of available links that are do not match to a feature from the camera in a current time frame; (c) calculating a similarity score between each member in the set of features and each member in the set of available links; wherein similarity between a feature and a link is a best similarity score between a descriptor of the feature and descriptors of features in the link; and (d) when the similarity score is greater than a threshold, adding the feature to the link Other implementations include methods including performing the actions of the system, non-transitory machine readable storage media storing program logic implementing such methods, substituents and components thereof, and devices incorporating any or combinations of the foregoing.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A system for guiding a mobile platform in an unmapped area, the system including:
    a mobile platform;
    a sensory interface coupling to one or more sensors including at least some visual sensors and at least some inertial sensors including at least a motion detector, wherein the one or more sensors are configured to sense one or more of position, motion or environment of the mobile platform;
    a processor coupled to the sensory interface and the mobile platform to provide guidance and control, and further coupled to a computer readable storage medium storing computer instructions configured for performing;
    maintaining a set of time dependent tracking states that include: (i) a pose and (ii) one or more frames of sensor readings including at least some frames from visual sensors wherein at least some frames include sets of 2D feature points located using image information from the visual sensors;
        wherein each frame of sensor readings can include sensory information received from any one of a plurality of sensors available to the mobile platform;
    selecting two or more tracking states from the set of time dependent tracking states;
    detecting when one or more visual sensors has failed or is not updating or is insufficiently updating and whenever one or more visual sensors has failed or is not updating or is insufficiently updating, using the motion detector to control pose estimation by tracking a set of inertial readings from the motion detector, using variance obtained for a plurality of dimensions in the set of inertial readings;
    updating current poses for at least two of the tracking states within the set of time dependent tracking states based upon the set of inertial readings from the motion detector as tracked; and
        guiding the mobile platform using at least one of the updated current poses determined for the at least two tracking states.

2. The system of claim 1, wherein tracking inertial readings using variance obtained for a plurality of dimensions in the set of inertial readings further includes:
    obtaining a computed variance for each dimension of a total of 3 dimensions of the set of inertial readings;
    determining whether the mobile platform is moving or at rest based upon the variance computed; and
    whenever the mobile platform is determined to be moving, performing extended Kalman filtering on a set of time dependent tracking states to determine pose information from the set of time dependent tracking states and whenever the mobile platform is determined to be static providing a computed pose whenever the mobile platform is determined to be at rest.

3. The system of claim 2, wherein the computed pose is determined by selectively performing at least one of:
   (i) propagating a zero velocity applied to location information of the pose and change orientation information determined for the mobile platform; and
   (ii) adding a noise factor to a previous pose.

4. The system of claim 2, wherein a variance above a threshold indicates a moving platform; and a variance below a threshold indicates a static platform.

5. The system of claim 1, further configured for performing: detecting a number of updates from an inertial measurement unit (IMU) that measures and reports linear acceleration using one or more accelerometers and rotational rate using one or more gyroscopes, wherein the updating occurs after a successful image update; and switching to gyroscopic sensor propagation after N consecutive IMU updates are detected.

6. The system of claim 1, further configured for performing synchronizing time associated with at least one of the set of time dependent tracking states with a time maintained by a controller unit controlling the mobile platform, by updating the time associated with the time associated with at least one of the a set of time dependent tracking states by (i) a constant offset and (ii) a transfer delay.

7. The system of claim 1, wherein the processor is further configured for performing:
   creating a 2D feature correspondences set comprising of common 2D feature points among the at least some frames from visual sensors from the tracking states selected;
   triangulating 2D feature points from the 2D feature correspondences set to form a 3D point set;
   selecting a subset of the 3D point set that includes 3D points having re-projection error within a threshold; and
   updating current poses for at least two of the tracking states within the set of time dependent tracking states subject to a criterion including reduction of a total of re-projection errors of the 3D points as selected.

8. The system of claim 7, wherein triangulating further includes selecting 3D points having a triangulation error less than a determined number of pixels.

9. The system of claim 7, further including adjusting a threshold for selecting 3d points to control propagation based upon a quantity of 3D points available to update poses in the set of time dependent tracking states.

10. The system of claim 7, further configured for performing dynamically determining a window size including a number of tracking states in the set of time dependent tracking states by maintaining a fixed manageable window size depending upon a parameter of at least one sensor.

11. The system of claim 7, further configured for performing dynamically determining a window size including a number of tracking states in the set of time dependent tracking states by maintaining a range of time spanning using the window size determined.

12. The system of claim 7, further configured for performing dynamically determining a window size including a number of tracking states in the set of time dependent tracking states by maintaining a manageable number of 3D points.

13. The system of claim 12, further configured for performing maintaining a number of 3D points in tracking states using a window size of less than 200.

14. The system of claim 7, further configured for performing refining 3D points using a least squares function.

15. The system of claim 7, further configured for performing: detecting a number of features in an image; and dynamically adjusting an exposure value of at least one visual sensor whenever a lack of features the image is detected.

16. The system of claim 7, further configured for performing: calculating a location of at least one 2D feature in an image using optical flow; reducing features to features existing along an epipolar line based upon a location calculated and a prediction of a camera pose; checking for similarity between descriptors of the feature and descriptors for a corresponding feature from a previous frame; determining whether number of features through optical flow is less than a number of features detected in a current frame, and whenever the number of features through optical flow is less than a number of features, detecting 2D corner features directly from an image at image regions without features; bin the image spatially, and adjust a number of features in each bin so that the number of features in the bins is balanced.

17. The system of claim 16, further configured for performing: linking features in different images captured at different times by a same camera.

18. The system of claim 16, further configured for performing: correlating unmatched features for a camera, by:
   collecting a set of features that are not matched to any other features by existing links; collecting a set of available links that are do not match to a feature from the camera in a current time frame; calculating a similarity score between each member in the set of features and each member in the set of available links; wherein similarity between a feature and a link is a best similarity score between a descriptor of the feature and descriptors of features in the link; and when the similarity score is greater than a threshold, adding the feature to the link.

19. A non-transitory computer readable medium having instructions stored thereon for performing a method of guiding a mobile platform in an unmapped area and without producing a map of the unmapped area, including:
   maintaining a set of time dependent tracking states that include: (i) a pose and (ii) one or more frames of sensor readings including at least some frames from visual sensors wherein at least some frames include sets of 2D feature points located using image information from the visual sensors;
      wherein each frame of sensor readings can include sensory information received from any one of a plurality of sensors available to the mobile platform;
   selecting two or more tracking states from the set of time dependent tracking states;
   detecting when one or more visual sensors has failed or is not updating or is insufficiently updating and whenever one or more visual sensors has failed or is not updating or is insufficiently updating, using a motion detector to control pose estimation by tracking a set of inertial readings from the motion detector, using variance obtained for a plurality of dimensions in the set of inertial readings;
   updating current poses for at least two of the two or more tracking states within the set of time dependent tracking states based upon the set of inertial readings from the motion detector as tracked; and guiding the mobile platform using at least one of the updated current poses determined for the at least two tracking states.

20. A method of guiding a mobile platform in an unmapped area, including:
   maintaining a set of time dependent tracking states that include: (i) a pose and (ii) one or more frames of sensor readings including at least some frames from visual sensors wherein at least some frames include sets of 2D feature points located using image information from the visual sensors;
      wherein each frame of sensor readings can include sensory information received from any one of a plurality of sensors available to the mobile platform;
   selecting two or more tracking states from the set of time dependent tracking states;
   detecting when one or more visual sensors has failed or is not updating or is insufficiently updating and whenever one or more visual sensors has failed or is not updating or is insufficiently updating, using a motion detector to control pose estimation by tracking a set of inertial readings from the motion detector, using variance obtained for a plurality of dimensions in the set of inertial readings;
   updating current poses for at least two of the two or more tracking states within the set of time dependent tracking states based upon the set of inertial readings from the motion detector as tracked; and
   guiding the mobile platform using at least one of the updated current poses determined for the at least two tracking states.

* * * * *

UNITED STATES PATENT AND TRADEMARK OFFICE
CERTIFICATE OF CORRECTION

PATENT NO. : 11,842,500 B2
APPLICATION NO. : 17/234576
DATED : December 12, 2023
INVENTOR(S) : Grace Tsai et al.

Page 1 of 1

It is certified that error appears in the above-identified patent and that said Letters Patent is hereby corrected as shown below:

In the Claims

In Column 44, Claim 19, Line 44, delete "producing a map of the unmapped area, including:" and insert -- producing a map of the unmapped area, which instructions when executed by a processor perform actions including: --, therefor.

Signed and Sealed this
Seventeenth Day of December, 2024

Derrick Brent
*Acting Director of the United States Patent and Trademark Office*